United States Patent [19]
Yamamoto

[11] Patent Number: 5,914,823
[45] Date of Patent: Jun. 22, 1999

[54] CAMERA LENS SYSTEMS

[75] Inventor: Chikara Yamamoto, Omiya, Japan

[73] Assignee: Fuji Photo Optical Co., Ltd., Saitama, Japan

[21] Appl. No.: 08/908,157

[22] Filed: Aug. 7, 1997

Related U.S. Application Data

[63] Continuation of application No. 08/426,135, Apr. 21, 1995, abandoned.

[30] Foreign Application Priority Data

Apr. 21, 1994 [JP] Japan .................................. 6-083490

[51] Int. Cl.$^6$ .................................................. G02B 13/04
[52] U.S. Cl. ............................ 359/749; 359/751; 359/752
[58] Field of Search ...................... 359/791, 792, 359/784, 771, 763, 756, 755, 754, 749–753

[56] References Cited

U.S. PATENT DOCUMENTS 4,206,973  6/1980  Ikemori ..................................... 359/749

FOREIGN PATENT DOCUMENTS 48-34531  5/1973  Japan .

Primary Examiner—Georgia Epps
Assistant Examiner—Jordan M. Schwartz
Attorney, Agent, or Firm—Young & Thompson

[57] ABSTRACT

In an image forming optical lens system comprising in order from the object end a first lens group of at least two components, a second lens group which has a positive focal length and comprises in order from the object end a first component of positive power, a second component of negative power and a third component of positive power, and a third lens group of at least one component, the components of the lens system are made of at least two different kinds of materials having differences in dispersion of 0.0055 at the greatest from one another and the first to third components of the second lens group are made of materials different in dispersion from one another.

16 Claims, 23 Drawing Sheets

CAMERA LENS SYSTEMS

This application is a continuation of application Ser. No. 08/426,135, filed Apr. 21, 1995, now abandoned.

BACKGROUND OF THE INVENTION

1. Field of the invention

The present invention relates to a lens system for use with a camera such as utilizes a charge coupled device (CCD), an image pick-up and a film as a recording medium of optical images.

2. Description of Related Art

In most cases of designing lens systems used suitably for ultraviolet rays in consideration of transmittance, materials of lens components are limited to crystals such as fluorite and silicate glass. If the lens system is comprised of lens components made of such crystals, not only, because of small differences in dispersion among the lens components, it is difficult to reduce color aberrations of the lens system but, because of low refracting indices of the lens components, the lens system tends to have a large Petzval sum. Consequently, the lens system has been often used as an object lens for, for instance, a microscope which ordinarily needs a narrow angle of view. In addition, some kinds of crystals render surfaces of lens components with small radii difficult to be precisely formed due to their structure or impossible to be made concave. These restraints imposed on shapes of lens components enhance aggravation of aberrations.

One of various efforts having been made to eliminate such problems is that described in Japanese Laid-Open Patent No. 48-34531. However, the lens system as described in Japanese Laid-Open Patent No. 48-34531 still has disadvantages such as a narrow angle of view of, for instance, approximately 29 degrees, an insufficiently corrected Petzval sum and an insufficient correction of color aberrations across, in particular, the intended wavelength range of ultraviolet rays.

SUMMARY OF THE INVENTION

It is an object of the present invention to provide a new and improved wide angle lens system which is sufficiently corrected in color aberrations and has a sufficiently suppressed Petzval sum even if the lens system is comprised of lens components made of materials having low dispersion.

Briefly stated, the invention in one form thereof consists of a wide angle lens system which comprises in order from the object end a first lens group of at least two components, a second lens group which has a positive focal length and comprises in order from the object end a first component of positive power, a second component of negative power and a third component of positive power, and a third lens group of at least one component. The second lens group may comprise three singlets, or otherwise include a doublet or a triplet. The components of the lens system are made of at least two different kinds of materials having differences in dispersion of 0.0055 at the greatest from one another. Together, the first to third components of the second lens group are made of materials different in dispersion from one another.

A wide angle lens system embodying the present invention may be designed for a wide range of angles of view by satisfying the following conditions:

$-0.75 < F/F1 < 0.75$            (I)

$0.3 < F/F2 < 1.55$            (II)

$-1.50 < F/F3 < 0.15$            (III)

$0.9 < F2/f1 < 5.0$            (IV)

$1.2 < |F2/f2| < 7$            (V)

$0.9 < F2/f3 < 2.4$            (VI)

where F is the overall focal length of the lens system, F1, F2 and F3 are the focal length of the first, second and third lens groups, respectively, and f1, f2 and f3 are the focal length v of the—the first, second and third components of the second lens group, respectively.

The dispersion v of the lens material N is expressed as follows:

$v = N_F - N_C$ where $N_F$ and $N_C$ are the refractive indices of lens materials for an F-spectrum of wavelength of 486.13 nm and a C-spectrum of wavelength of 656.27 nm, respectively.

The transmittance of each lens material of a thickness of 10 mm is preferred to be at least 50% for light rays of wavelength from 300 to 800 nm. fluorite glass and silicate glass for these components are preferred. Specifically, the third lens group is preferred to comprise first and third components made of fluorite glass and a second component made of silicate glass.

The parameters set forth are necessary for suitably balancing the aberrations of the lens system. Together, the conditions prevent or significantly reduce aggravation of spherical aberration, coma, distortion and color aberrations.

The first conditions (I)–(III) are necessary for suitable distribution of power for suitably balancing the aberrations of the optical system. If the lower limit of the first condition (I) is exceeded, the first lens group has a too strong negative power, so that distances of paraxial rays from the optical axis incident upon the second lens group are too large. This leads to aggravation of spherical aberration. On the other hand, if the upper limit of the first condition (I) is exceeded, the first lens group has a too strong positive power, so that distances of paraxial rays from the optical axis incident upon the second lens group are too small. This leads to aggravation of color aberrations of the second lens group. Further, that makes the back focal length of the optical system short which is not always desirable.

The second condition (II) defines the power of the second lens group. If the lower limit of the second condition (II) is exceeded, the second lens group has a too weak positive power, so that the second lens group suffers aggravation of color aberrations. If the upper limit of the second condition (II) is exceeded, the second lens group has a strong positive power and a too small radius, being rendered difficult to be corrected in color aberrations. Further, if lens components are made of fluorite glass, it is difficult to finish the surfaces of the lens components with a high precision.

Because, in the optical system, the Petzval sum is corrected by the third lens group which allows high paraxial rays to enter, if the lower limit of the third condition (III) is exceeded, the third lens group has a too strong negative power, not only making the back focal length of the optical system short which is not always desirable but also being rendered difficult to be corrected in coma and distortion. On the other hand, if the upper limit of the third condition (III)

is exceeded, the third lens group has a too strong positive power, making the Petzval sum too large. This increases aggravation of field curvature of the system.

Together, if the lower limits of the fourth to sixth conditions (IV)–(VI) are exceeded all together, the second lens group has a too weak power, increasing aggravation of color aberrations. On the other hand, if the upper limits of the fourth to sixth conditions (IV)–(VI) are exceeded all together, the second lens group has a too strong power and a too small radius, rendering the optical system difficult to be corrected in spherical aberration. In addition, if lens components are made of fluorite glass, it is difficult to finish the surfaces of the lens components with a high precision.

The optical system of the present invention may comprises lens components made of silica glass and/or fluorite glass which have high transmittance in a range of wavelength of ultraviolet light and a small difference in dispersion, preventing or significantly reducing of various aberrations. The utilization of materials which have transmittance higher than approximately 50% for light of wavelength between 300 and 800 nm enables the optical system to be used over a range from ultraviolet light to visible light.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

In the following prescription tables where various versions of the invention are set forth, the reference L followed by an arabic numeral indicates the lens component progressively from the object end to the image end of the photographic lens system. The reference S followed by an arabic numeral indicates the lens surface progressively from the object end to the image end of the zoom lens system. The reference radius numbers r are the progressive lens surface radii. The reference N and d are the index of refraction of the lens component for i-spectrum and the progressive axial distance between adjacent surfaces, respectively.

FIGS. 1–8 show various versions of a first embodiment of the present invention. The lens systems are composed of three lens groups, namely first and second and third lens groups G1, G2 and G3 arranged along the optical axis X in order from the object end to the image end. The first lens group G1 comprises in order from the object end two, namely first and second, lens components L1 and L2 between which a lens stop D is stationarily disposed. The second lens group G2 comprises in order from the object end a third bi-convex lens component L3, a fourth bi-concave lens component L4 and a fifth bi-convex lens component L5. The third lens group G3 comprises two, namely sixth and seventh, lens components L6 and L7. A parallel flat cover plate G4 is disposed at a certain distance behind the image end surface of the seventh lens component L7. These optical components including the lens components L1–L7 and the parallel flat cover plate G4 are in fixed relation.

Figure 1:
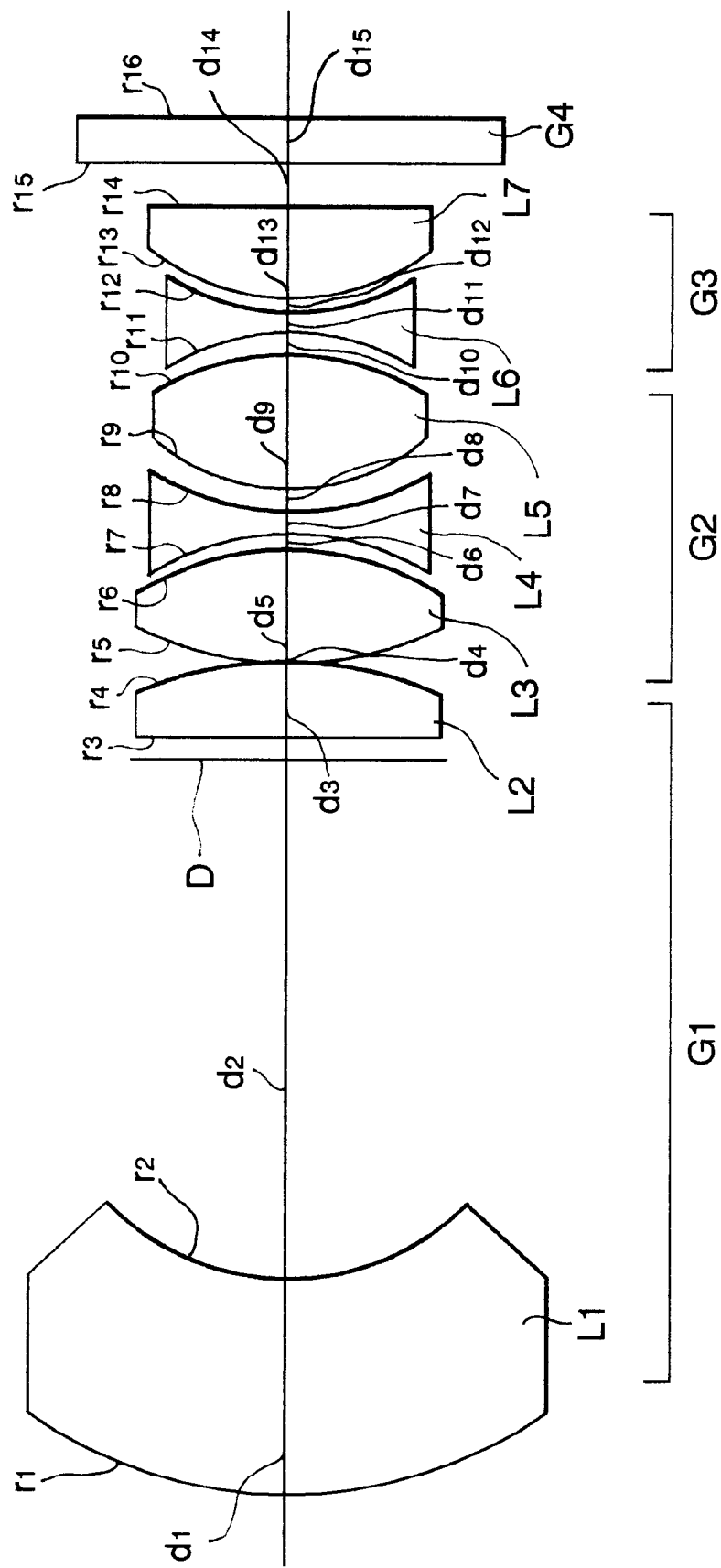
FIG. 1 is a diagrammatic side view of a lens system embodying the present invention.

In the lens system shown in FIG. 1, the lens stop D is stationarily disposed at a distance of 0.9857 mm in front of the object end surface of the second lens component L2.

The lens system as shown in FIG. 1 is substantially described in Table I.

TABLE I

F No. = 2.5 Angle of View = 34.48°

| Component | | Radius of Curvature (mm) | Axial Distance Between Surfaces (mm) | N |
|---|---|---|---|---|
| $L_1$ | S1 | $r_1 = 23.9660$ | $d_1 = 9.9262$ | 1.47454 |
| | S2 | $r_2 = 11.2800$ | | |
| | | | $d_2 = 25.9857$ | |
| $L_2$ | S3 | $r_3 = 52.4481$ | $d_3 = 3.7473$ | 1.44491 |
| | S4 | $r_4 = -22.0621$ | | |
| | | | $d_4 = 0.1$ | |
| $L_3$ | S5 | $r_5 = 15.9527$ | $d_5 = 5.4006$ | 1.44491 |
| | S6 | $r_6 = -16.6354$ | | |
| | | | $d_6 = 0.7501$ | |
| $L_4$ | S7 | $r_7 = -13.0937$ | $d_7 = 1.0$ | 1.47454 |
| | S8 | $r_8 = 9.5032$ | | |
| | | | $d_8 = 1.0001$ | |
| L5 | S9 | $r_9 = 11.3864$ | $d_9 = 6.7394$ | 1.44491 |
| | S10 | $r_{10} = -11.1132$ | | |
| | | | $d_{10} = 0.9999$ | |
| $L_6$ | S11 | $r_{11} = -13.9526$ | $d_{11} = 1.0$ | 1.47454 |
| | S12 | $r_{12} = 9.6928$ | | |
| | | | $d_{12} = 1.0$ | |
| $L_7$ | S13 | $r_{13} = 11.2385$ | $d_{13} = 4.8019$ | 1.44491 |
| | S14 | $r_{14} = \infty$ | | |
| | | | $d_{14} = 2.0$ | |
| G4 | S15 | $r_{15} = \infty$ | $d_{15} = 2.55$ | 1.47454 |
| | S16 | $r_{16} = \infty$ | | |

| F | F1 | F2 | F3 | f1 | f2 | f3 |
|---|---|---|---|---|---|---|
| 25.76 | 57.244 | 22.4 | −24.769 | 19.31 | −11.429 | 13.913 |

The lens system depicted in FIG. 1 and described in Table I has the following parameters described as follows:

| F/F1 | F/F2 | F/F3 | F2/f1 | |F2/f2| | F2/f3 |
|---|---|---|---|---|---|
| 0.54 | 1.15 | −1.04 | 1.16 | 1.96 | 1.61 |

As apparent from the above, the lens system shown in FIG. 1 satisfies the conditions (I)–(VI). Together, the lens components L2, L3, L5 and L7 are made of fluorite glass and the lens components L1, L4 and L6 and the cover glass G4 are made of silicate glass. The dispersion is different between the first and second lens components L3 and L4 and between the second and third lens components L4 and L5.

Figure 2:
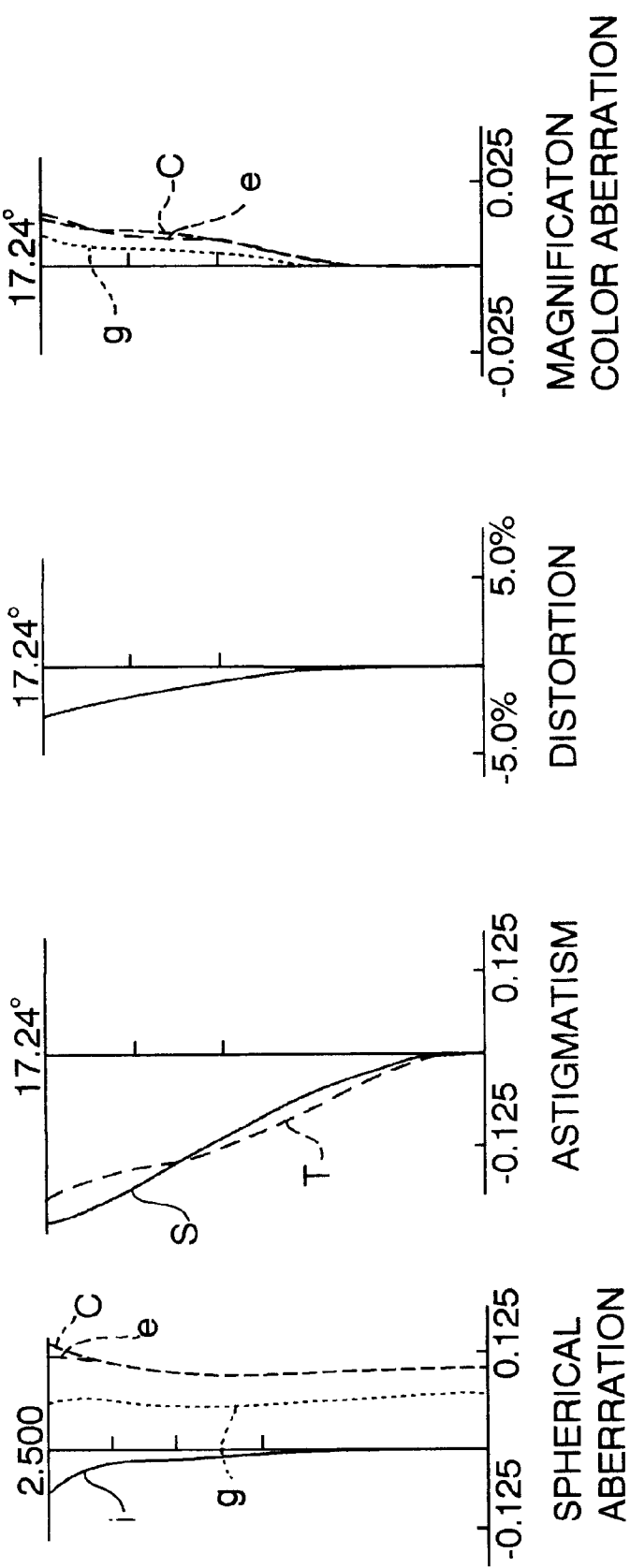
FIG. 2 shows diagrams of spherical aberration, astigmatism, distortion and magnification color aberration of the lens system of FIG. 1.

FIG. 2 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 1. As apparent in FIG. 2, the lens system has superior correction for these aberrations.

Figure 3:
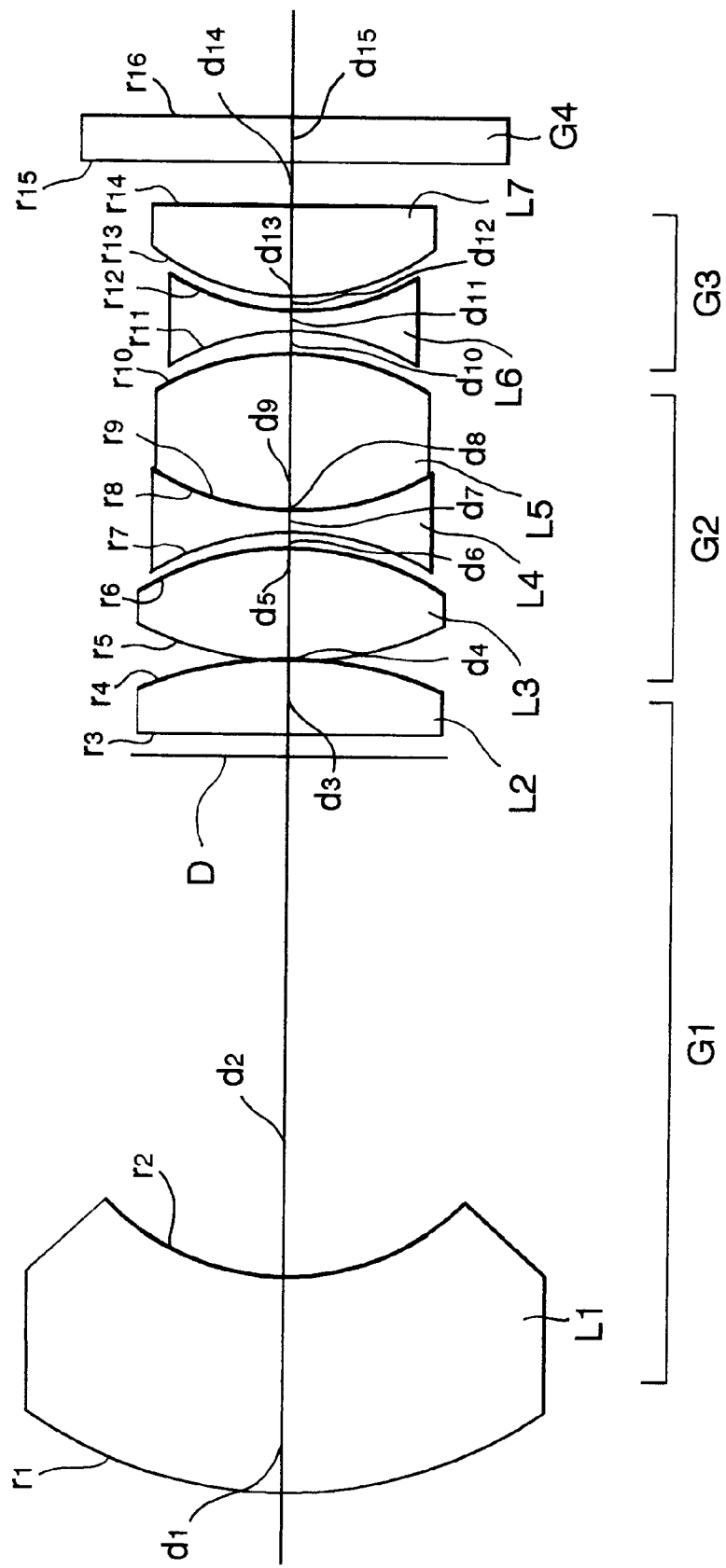
FIG. 3 is a diagrammatic side view of a lens system of a second embodiment of the present invention.

FIG. 3 shows a second version of the first embodiment of the present invention in which a lens stop D is stationarily disposed at a distance of 1.3689 mm in front of the object end surface of the second lens component L2. The second lens group G2 includes a doublet comprising the fourth and fifth lens components L4 and L5 cemented together.

The lens system as shown in FIG. 3 is substantially described in Table II.

TABLE II

F No. = 2.5 Angle of View = 34.50°

| Component | | Radius of Curvature (mm) | Axial Distance Between Surfaces (mm) | N |
|---|---|---|---|---|
| $L_1$ | S1 | $r_1 = 22.6687$ | $d_1 = 10.000$ | 1.47454 |
| | S2 | $r_2 = 10.5512$ | | |
| | | | $d_2 = 26.3689$ | |
| $L_2$ | S3 | $r_3 = 212.6157$ | $d_3 = 3.7200$ | 1.44491 |
| | S4 | $r_4 = -17.9567$ | | |
| | | | $d_4 = 0.100$ | |
| $L_3$ | S5 | $r_5 = 17.2749$ | $d_5 = 5.0841$ | 1.44491 |
| | S6 | $r_6 = -17.7102$ | | |
| | | | $d_6 = 0.7500$ | |
| $L_4$ | S7 | $r_7 = -14.0756$ | $d_7 = 1.0000$ | 1.47454 |
| | S8 | $r_8 = 8.164$ | | |
| | | | $d_8 = 0$ | |
| L5 | S9 | $r_9 = 8.164$ | $d_9 = 8.3860$ | 1.44491 |
| | S10 | $r_{10} = -11.8778$ | | |
| | | | $d_{10} = 0.9999$ | |
| $L_6$ | S11 | $r_{11} = -12.4212$ | $d_{11} = 1.0000$ | 1.47454 |
| | S12 | $r_{12} = 10.6415$ | | |
| | | | $d_{12} = 1.0000$ | |
| $L_7$ | S13 | $r_{13} = 11.8335$ | $d_{13} = 4.0417$ | 1.44491 |
| | S14 | $r_{14} = -1764.3175$ | | |
| | | | $d_{14} = 2.0000$ | |
| G4 | S15 | $r_{15} = \infty$ | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.75 | 52.551 | 22.391 | −23.624 | 20.542 | −10.765 | 12.509 |

The lens system depicted in FIG. 3 and described in Table II has the following parameters described as follows:

| F/F1 | F/F2 | F/F3 | F2/f1 | |F2/f2| | F2/f3 |
|---|---|---|---|---|---|
| 0.49 | 1.15 | −1.09 | 1.09 | 2.08 | 1.79 |

As apparent from the above, the lens system shown in FIG. 3 satisfies the conditions (I)–(VI). Together, the lens components L2, L3, L5 and L7 are made of fluorite glass and the lens components L1, L4 and L6 and the cover plate G4 are made of silicate glass. The dispersion is different between the first and second lens components L3 and L4 and between the second and third lens components L4 and L5.

Figure 4:
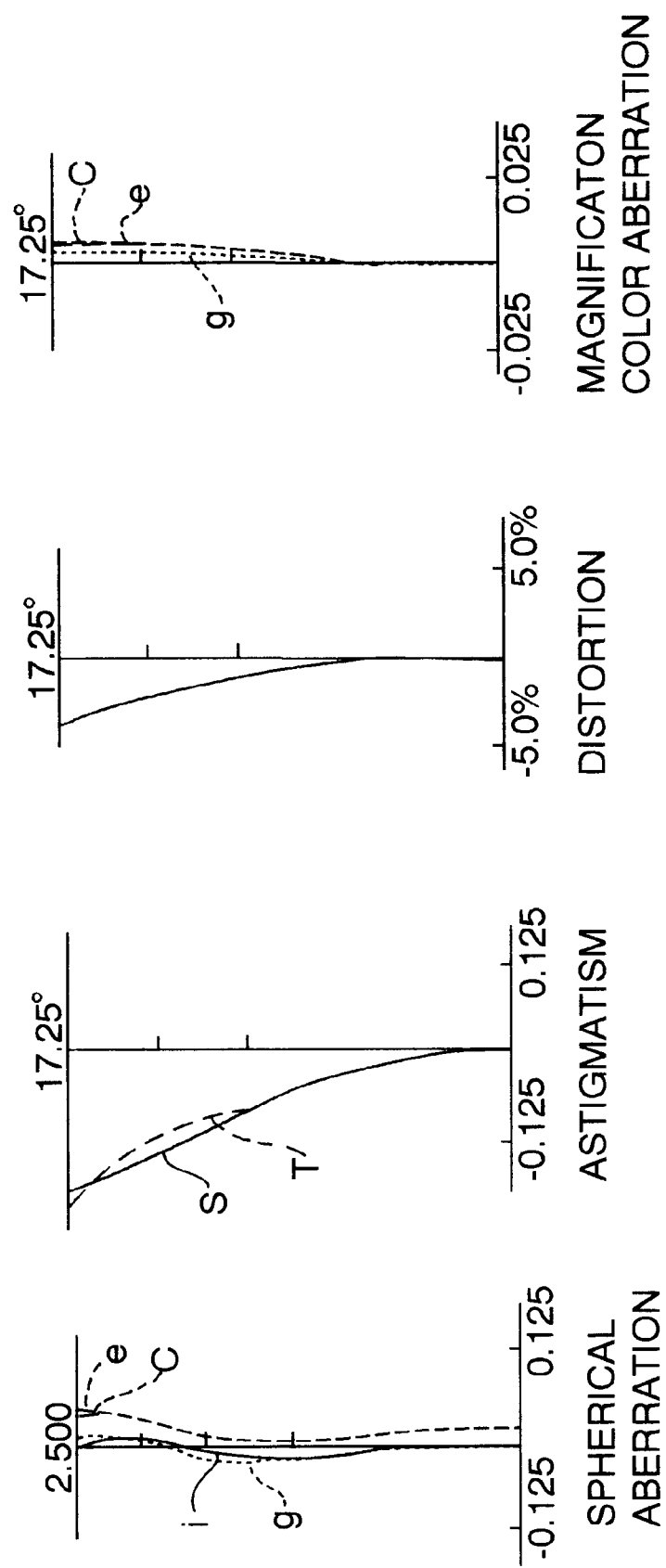
FIG. 4 shows diagrams of spherical aberration, astigmatism, distortion and magnification color aberration of the lens system of FIG. 3.

FIG. 4 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 3. As apparent in FIG. 4, the lens system has superior correction for these aberrations.

Figure 5:
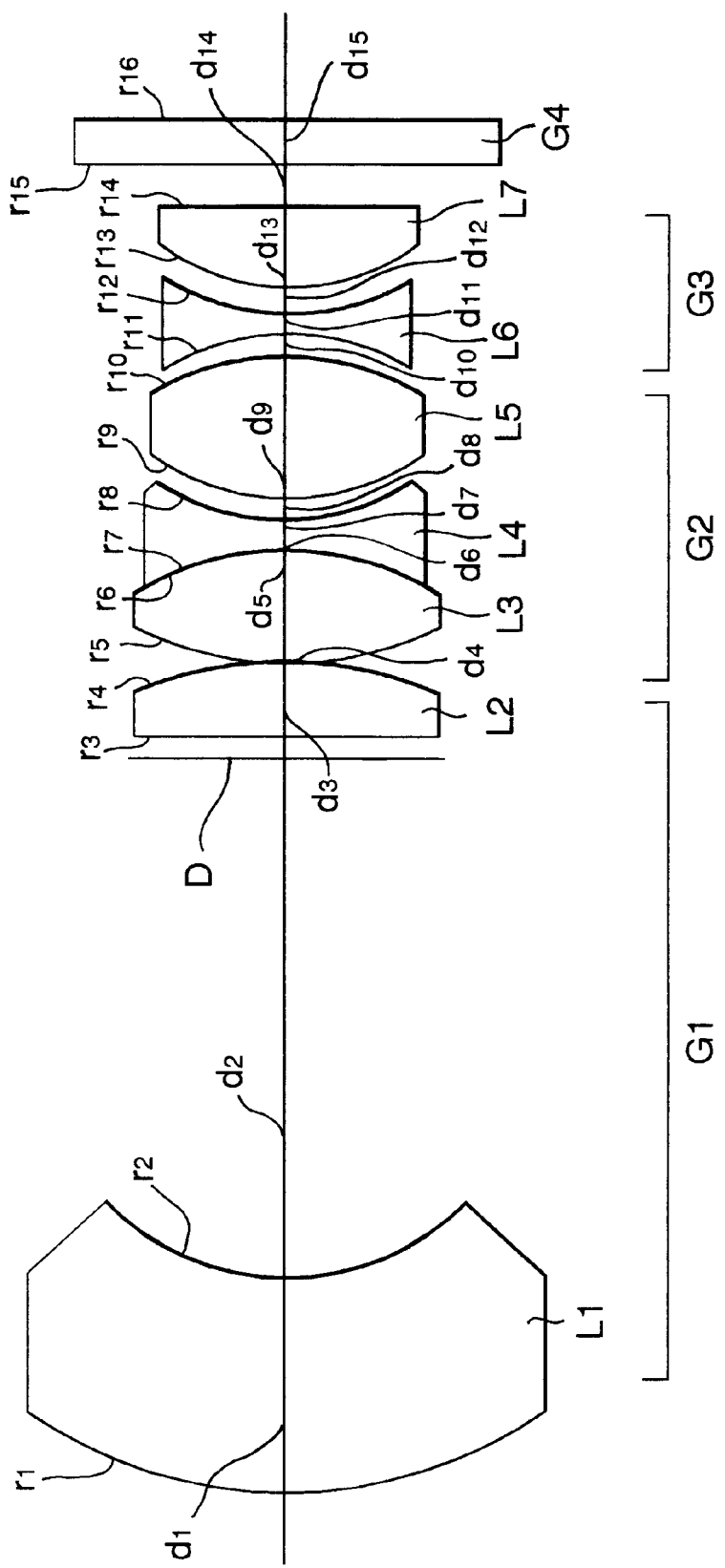
FIG. 5 is a diagrammatic side view of a lens system of a third embodiment of the present invention.

FIG. 5 shows a third version of the first embodiment of the present invention in which a lens stop D is stationarily disposed at a distance of 1.4018 mm in front of the object end surface of the second lens component L2. The second lens group G2 includes a doublet comprising the third and fourth lens components L3 and L4 cemented together.

The lens system as shown in FIG. 5 is substantially described in Table III.

TABLE III

F No. = 2.5 Angle of View = 34.48°

| Component | | Radius of Curvature (mm) | Axial Distance Between Surfaces (mm) | N |
|---|---|---|---|---|
| $L_1$ | S1 | $r_1 = 24.9171$ | $d_1 = 9.9358$ | 1.47454 |
| | S2 | $r_2 = 11.4855$ | $d_2 = 26.4008$ | |
| $L_2$ | S3 | $r_3 = 320.9305$ | $d_3 = 3.567$ | 1.44491 |
| | S4 | $r_4 = -19.9207$ | $d_4 = 0.1001$ | |
| $L_3$ | S5 | $r_5 = 13.9293$ | $d_5 = 6.6087$ | 1.44491 |
| | S6 | $r_6 = -13.2100$ | $d_6 = 0$ | |
| $L_4$ | S7 | $r_7 = -13.2100$ | $d_7 = 1.0131$ | 1.47454 |
| | S8 | $r_8 = 9.6419$ | $d_8 = 1.0061$ | |
| L5 | S9 | $r_9 = 9.8346$ | $d_9 = 6.3403$ | 1.44491 |
| | S10 | $r_{10} = -14.4150$ | $d_{10} = 1.0033$ | |
| $L_6$ | S11 | $r_{11} = -11.8551$ | $d_{11} = 1.0006$ | 1.47454 |
| | S12 | $r_{12} = 9.5828$ | $d_{12} = 1.0031$ | |
| $L_7$ | S13 | $r_{13} = 11.6447$ | $d_{13} = 3.8428$ | 1.44491 |
| | S14 | $r_{14} = -7240.6751$ | $d_{14} = 2.0000$ | |
| G4 | S15 | $r_{15} = \infty$ | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.76 | 66.051 | 20.125 | −20.608 | 16.496 | −11.5 | 14.273 |

The lens system depicted in FIG. 5 and described in Table III has the following parameters described as follows:

| F/F1 | F/F2 | F/F3 | F2/f1 | |F2/f2| | F2/f3 |
|---|---|---|---|---|---|
| 0.39 | 1.28 | −1.25 | 1.22 | 1.75 | 1.41 |

As apparent from the above, the lens system shown in FIG. 5 satisfies the conditions (I)–(VI). Together, the lens components L2, L3, L5 and L7 are made of fluorite glass and the lens components L1, L4 and L6 and the cover plate G4 are made of silicate glass. The dispersion is different between the first and second lens components L3 and L4 and between the second and third lens components L4 and L5.

Figure 6:
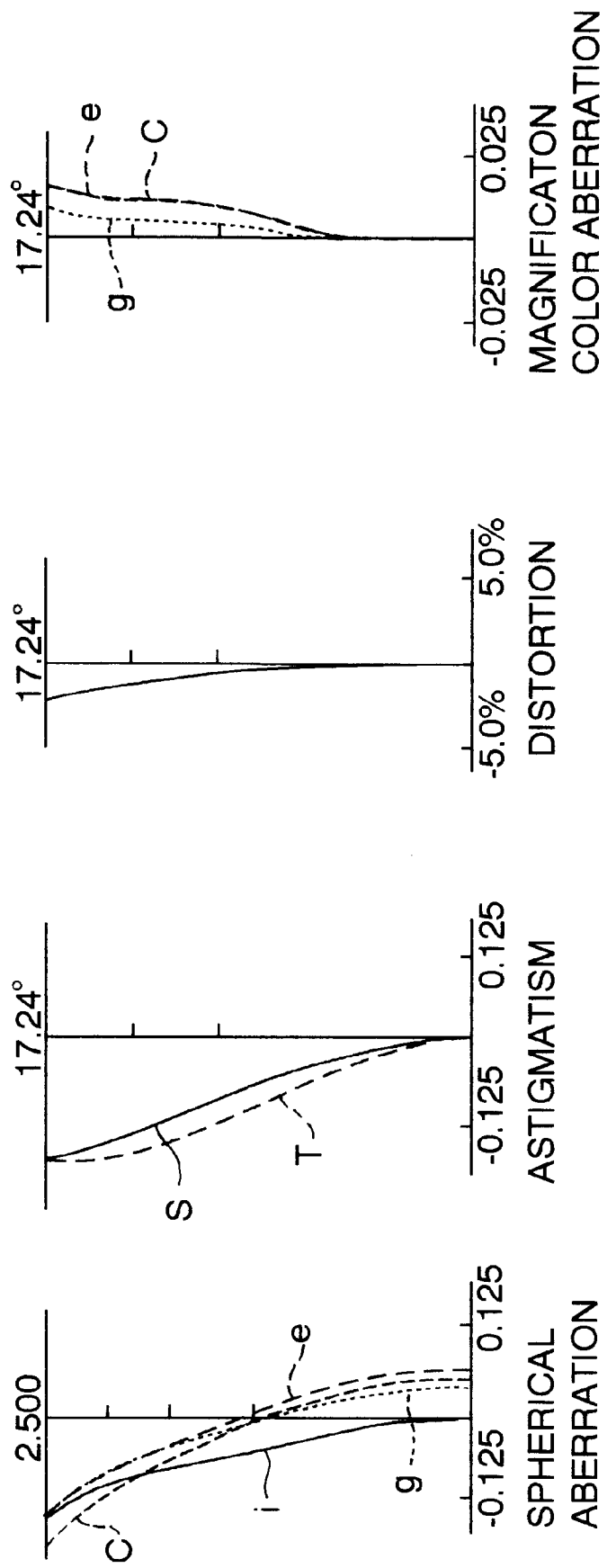
FIG. 6 shows diagrams of spherical aberration, astigmatism, distortion and magnification color aberration of the lens system of FIG. 5.

FIG. 6 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 5. As apparent in FIG. 6, the lens system has superior correction for these aberrations.

Figure 7:
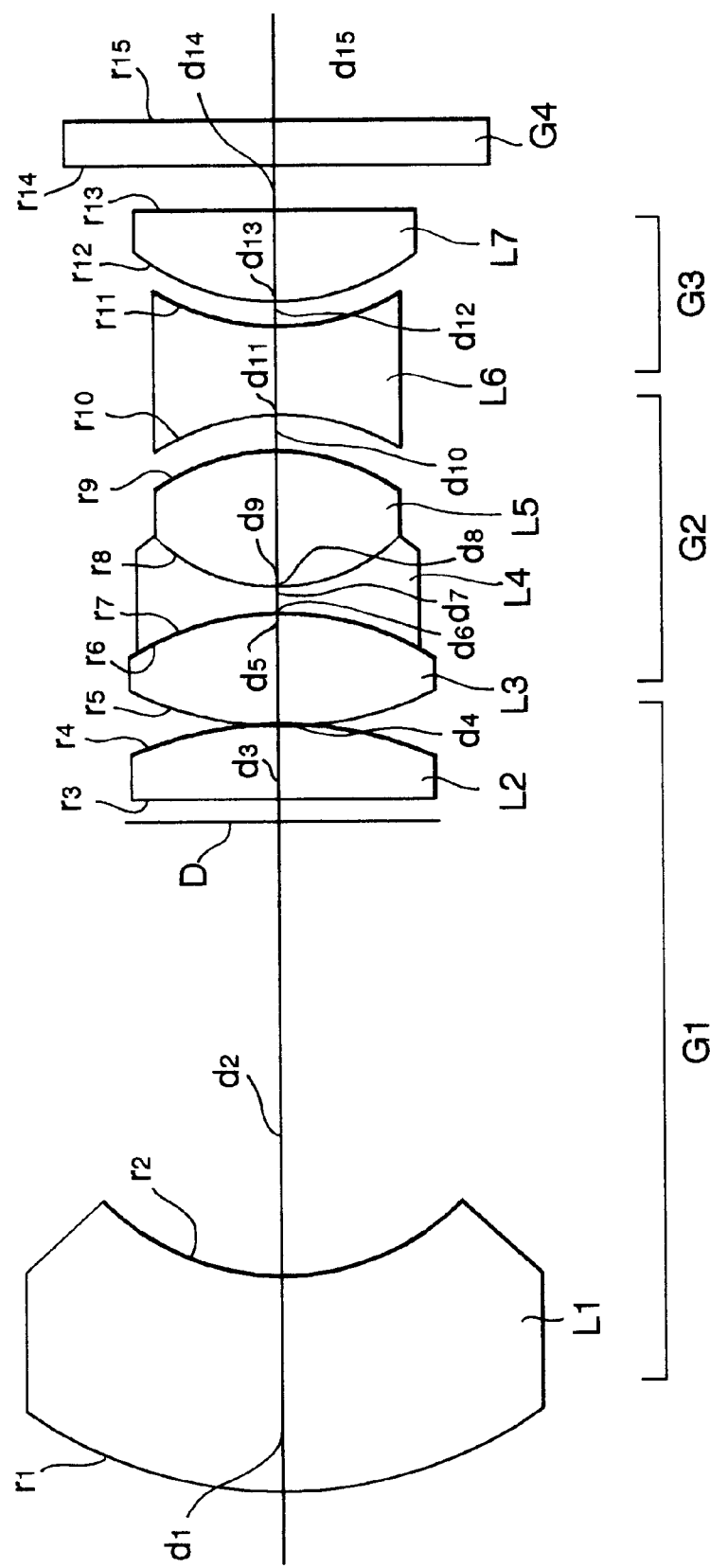
FIG. 7 is a diagrammatic side view of a lens system of a fourth embodiment of the present invention.

FIG. 7 shows a fourth version of the first embodiment of the present invention in which a lens stop D is stationarily disposed at a distance of 1.3206 mm in front of the object end surface of the second lens component L2. The second lens group G2 includes a triplet comprising the third, fourth and fifth lens components L3, L4 and L5 cemented together.

The lens system as shown in FIG. 7 is substantially described in Table IV.

TABLE IV

F No. = 2.5 Angle of View = 34.50°

| Component | | Radius of Curvature (mm) | Axial Distance Between Surfaces (mm) | N |
|---|---|---|---|---|
| $L_1$ | S1 | $r_1 = 22.4734$ | $d_{1\ =\ 10.0088}$ | 1.47454 |
| | S2 | $r_2 = 11.0857$ | $d_2 = 23.4071$ | |
| $L_2$ | S3 | $r_3 = 132.1196$ | $d_3 = 3.4406$ | 1.44491 |
| | S4 | $r_4 = -20.0776$ | $d_4 = 0.1000$ | |
| $L_3$ | S5 | $r_5 = 14.6176$ | $d_5 = 6.1359$ | 1.44491 |
| | S6 | $r_6 = -11.7794$ | $d_6 = 0$ | |
| $L_4$ | S7 | $r_7 = -11.7794$ | $d_7 = 0.9498$ | 1.47454 |
| | S8 | $r_8 = 8.4994$ | $d_8 = 0$ | |
| $L_5$ | S9 | $r_9 = 8.4994$ | $d_9 = 6.9201$ | 1.44491 |
| | S10 | $r_{10} = -14.7415$ | $d_{10} = 1.3550$ | |
| $L_6$ | S11 | $r_{11} = -12.2623$ | $d_{11} = 4.8411$ | 1.47454 |
| | S12 | $r_{12} = 9.4213$ | $d_{12} = 1.2466$ | |
| $L_7$ | S13 | $r_{13} = 11.3787$ | $d_{13} = 4.2154$ | 1.44491 |
| | S14 | $r_{14} = 15532.5120$ | $d_{14} = 2.0000$ | |
| G4 | S15 | $r_{15} = \infty$ | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.75 | 61.310 | 21.107 | −21.458 | 15.917 | −10.148 | 13.275 |

The lens system depicted in FIG. 7 and described in Table III has the following parameters described as follows:

| F/F1 | F/F2 | F/F3 | F2/f1 | |F2/f2| | F2/f3 |
|---|---|---|---|---|---|
| 0.42 | 1.22 | −1.20 | 1.33 | 2.08 | 1.59 |

As apparent from the above, the lens system shown in FIG. 7 satisfies the conditions (I)–(VI). Together, the lens components L2, L3, L5 and L7 are made of fluorite glass and the lens components L1, L4 and L6 and the cover plate G4 are made of silicate glass. The dispersion is different between the first and second lens components L3 and L4 and between the second and third lens components L4 and L5.

Figure 8:
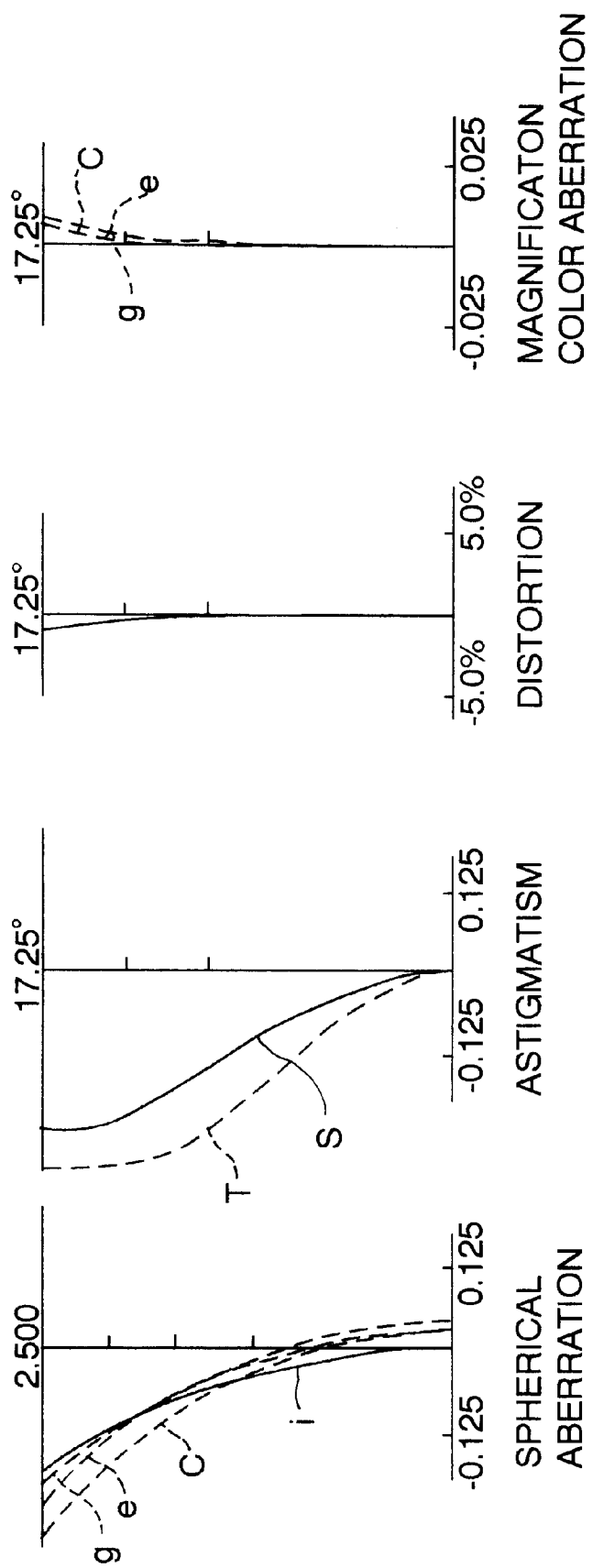
FIG. 8 shows diagrams of spherical aberration, astigmatism, distortion and magnification color aberration of the lens system of FIG. 7.

FIG. 8 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 7. As apparent in FIG. 8, the lens system has superior correction for these aberrations.

FIGS. 9–18 show various versions of a second embodiment of the present invention. The lens systems are composed of three lens groups, namely first and second and third lens groups G1, G2 and G3 arranged along the optical axis X in order from the object end to the image end. The first lens group G1 comprises in order from the object end two, namely first and second, lens components L1 and L2 The second lens group G2 comprises in order from the object end a third bi-convex lens component L3, a fourth bi-concave lens component L4 and a fifth bi-convex lens component L5.

The third lens group G3 comprises one or two, namely sixth and seventh, lens components L6 and L7. A lens stop D is stationarily disposed between the first and second lens groups G1 and G2. A parallel flat cover plate G4 is disposed at a certain distance behind the image end surface of the sixth or seventh lens component L6 or L7. These optical components including the lens components L1–L7 and the parallel flat cover plate G4 are in fixed relation.

Figure 9:
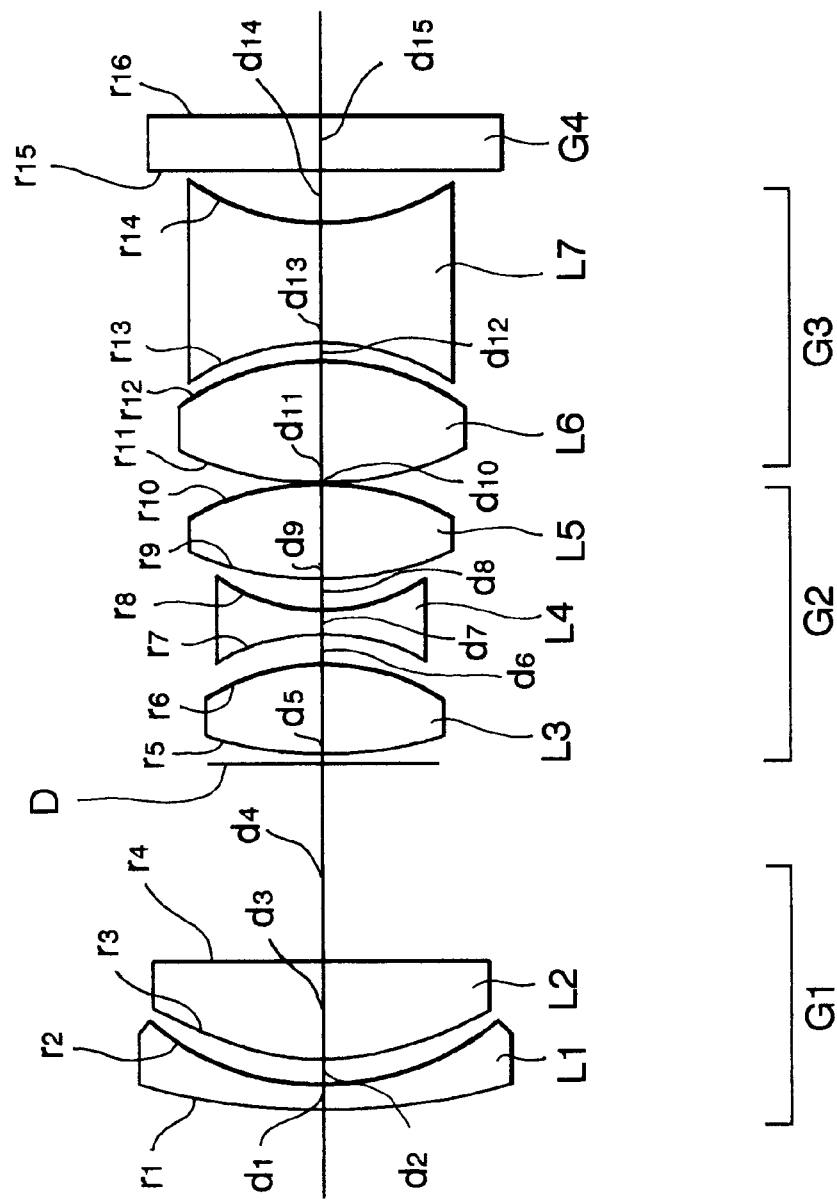
FIG. 9 is a diagrammatic side view of a lens system of a fifth embodiment of the present invention.

FIG. 9 shows a first version of the second embodiment of the present invention in which a lens stop D is stationarily disposed at a distance of 0.5004 mm in front of the object end surface of the third lens component L3. The third lens group G3 comprises two, namely sixth and seventh, lens components L6 and L7.

The lens system as shown in FIG. 9 is substantially described in Table V.

TABLE V

F No. = 2.5 Angle of View = 34.50°

| Component | | Radius of Curvature (mm) | Axial Distance Between Surfaces (mm) | N |
|---|---|---|---|---|
| $L_1$ | S1 | $r_1$ = 23.8147 | | |
| | | | $d_{1-1.0026}$ | 1.47454 |
| | S2 | $r_2$ = 10.0929 | | |
| | | | $d_2$ _ 1.2583 | |
| $L_2$ | S3 | $r_3$ = 12.4516 | | |
| | | | $d_3$ = 4.2303 | 1.44491 |
| | S4 | $r_4$ = 142.6490 | | |
| | | | $d_4$ = 9.3229 | |
| $L_3$ | S5 | $r_5$ = 17.2963 | | |
| | | | $d_5$ = 3.6873 | 1.44491 |
| | S6 | $r_6$ = −12.1061 | | |
| | | | $d_6$ = 1.2596 | |
| $L_4$ | S7 | $r_7$ = −9.8721 | | |
| | | | $d_7$ = 1.1823 | 1.47454 |
| | S8 | $r_8$ = 9.6330 | | |
| | | | $d_8$ = 1.2458 | |
| $L_5$ | S9 | $r_9$ = 19.9700 | | |
| | | | $d_9$ = 4.2708 | 1.44491 |
| | S10 | $r_{10}$ = −11.6384 | | |
| | | | $d_{10}$ = 0.1003 | |
| $L_6$ | S11 | $r_{11}$ = 18.4670 | | |
| | | | $d_{11}$ = 5.0541 | 1.47454 |
| | S12 | $r_{12}$ = −10.3953 | | |
| | | | $d_{12}$ = 0.7458 | |
| $L_7$ | S13 | $r_{13}$ = −11.0881 | | |
| | | | $d_{13}$ = 5.3058 | 1.44491 |
| | S14 | $r_{14}$ = 9.8022 | | |
| | | | $d_{14}$ = 2.0000 | |
| G4 | S15 | $r_{15}$ = ∞ | | |
| | | | $d_{15}$ = 2.5500 | 1.47454 |
| | S16 | $r_{16}$ = ∞ | | |

| F | F1 | F2 | F3 | f1 | f2 | f3 |
|---|---|---|---|---|---|---|
| 25.75 | 143.056 | 33.013 | −99.038 | 16.507 | −9.914 | 17.194 |

The lens system depicted in FIG. 9 and described in Table V has the following parameters described as follows:

| F/F1 | F/F2 | F/F3 | F2/f1 | |F2/f2| | F2/f3 |
|---|---|---|---|---|---|
| 0.18 | 0.78 | −0.26 | 2.00 | 3.33 | 1.92 |

As apparent from the above, the lens system shown in FIG. 9 satisfies the conditions (I)–(VI). Together, the lens components L2, L3 and L5 are made of fluorite glass and the lens components L1, L4 and L6 and the cover plate G4 are made of silicate glass. The dispersion is different between the first and second lens components L3 and L4 and between the second and third lens components L4 and L5.

Figure 10:
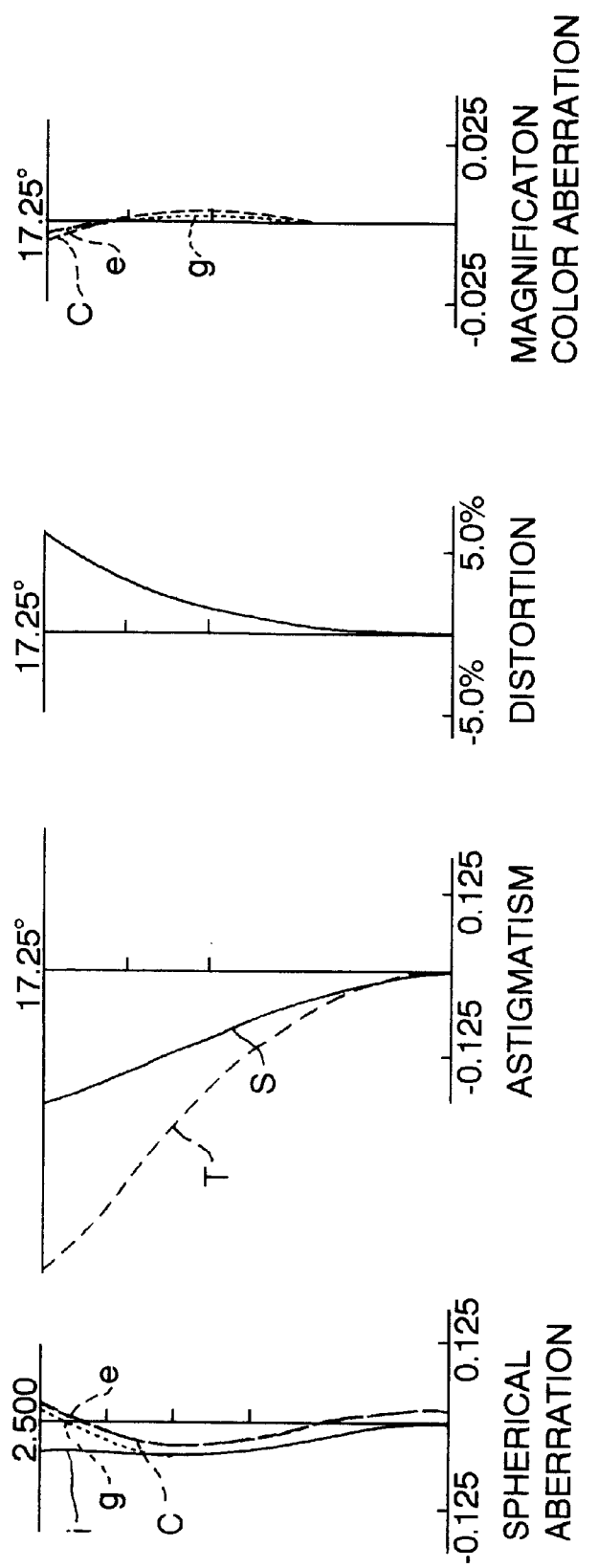
FIG. 10 shows diagrams of spherical aberration, astigmatism, distortion and magnification color aberration of the lens system of FIG. 9.

FIG. 10 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 9. As apparent in FIG. 10, the lens system has superior correction for these aberrations.

Figure 11:
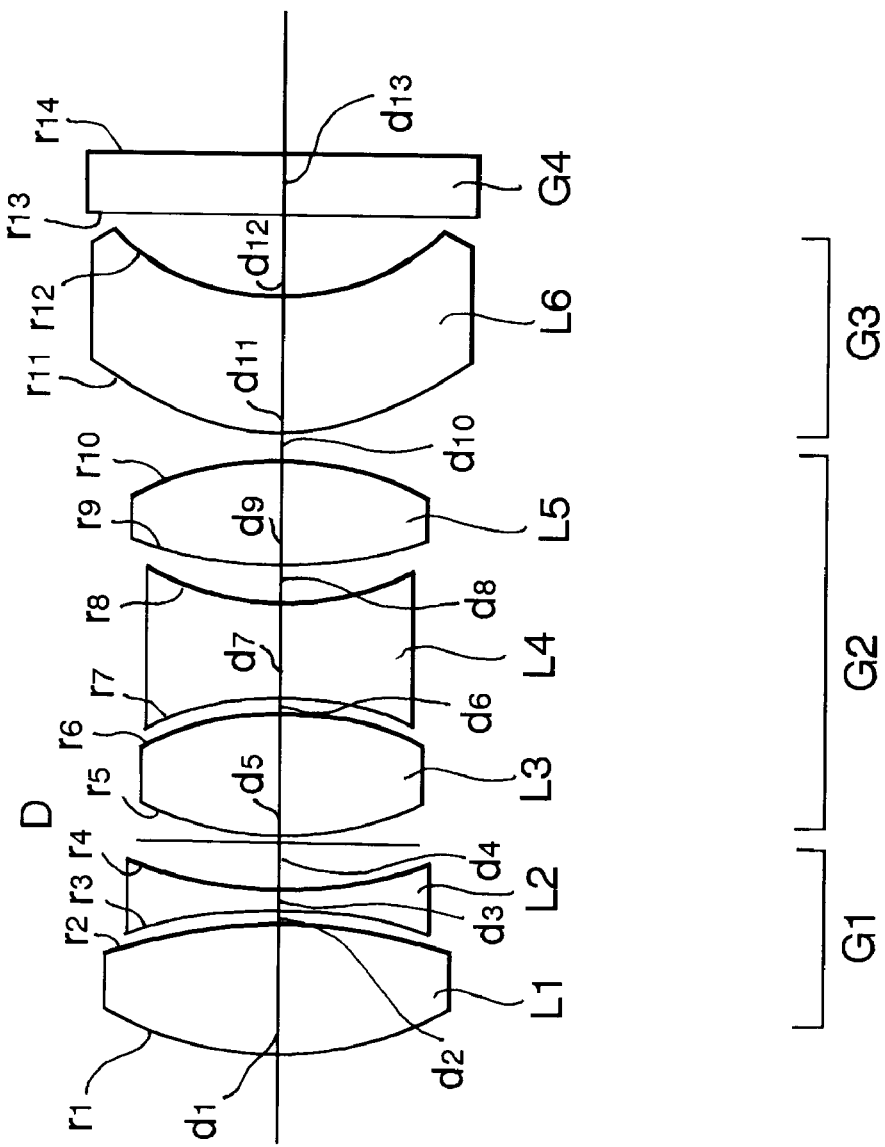
FIG. 11 is a diagrammatic side view of a lens system of a sixth embodiment of the present invention.

FIG. 11 shows a fifth version of the embodiment of the present invention in which a lens stop D is stationarily disposed at a distance of 0.3 mm in front of the object end surface of the third lens component L3. The third lens group G3 comprises a single lens component L6.

The lens system as shown in FIG. 11 is substantially described in Table VI.

TABLE VI

F No. = 2.504 Angle of View = 34.48°

| Component | | Radius of Curvature (mm) | Axial Distance Between Surfaces (mm) | N |
|---|---|---|---|---|
| $L_1$ | S1 | $r_1$ = 14.2465 | | |
| | | | $d_{1-4.0484}$ | 1.47454 |
| | S2 | $r_2$ = −19.6229 | | |
| | | | $d_2$ _ 0.5644 | |
| $L_2$ | S3 | $r_3$ = −15.6487 | | |
| | | | $d_3$ = 1.0000 | 1.44491 |
| | S4 | $r_4$ = 24.5485 | | |
| | | | $d_4$ = 1.7371 | |
| $L_3$ | S5 | $r_5$ = 9.8040 | | |
| | | | $d_5$ = 4.1775 | 1.44491 |
| | S6 | $r_6$ = −11.6842 | | |
| | | | $d_6$ = 0.5320 | |
| $L_4$ | S7 | $r_7$ = −10.2333 | | |
| | | | $d_7$ = 3.2945 | 1.47454 |
| | S8 | $r_8$ = 7.8683 | | |
| | | | $d_8$ = 1.3165 | |
| $L_5$ | S9 | $r_9$ = 23.6511 | | |
| | | | $d_9$ = 3.1266 | 1.44491 |
| | S10 | $r_{10}$ = −17.6213 | | |
| | | | $d_{10}$ = 1.0506 | |
| $L_6$ | S11 | $r_{11}$ = 8.8540 | | |
| | | | $d_{11}$ = 4.5398 | 1.47454 |
| | S12 | $r_{12}$ = 7.5565 | | |
| | | | $d_{12}$ = 2.0000 | |
| G4 | S13 | $r_{13}$ = ∞ | | |
| | | | $d_{13}$ = 2.5500 | 1.47454 |
| | S14 | $r_{14}$ = ∞ | | |

| F | F1 | F2 | F3 | f1 | f2 | f3 |
|---|---|---|---|---|---|---|
| 25.75 | 117.045 | 35.764 | 858.333 | 12.505 | −8.941 | 23.223 |

The lens system depicted in FIG. 11 and described in Table VI has the following parameters described as follows:

| F/F1 | F/F2 | F/F3 | F2/f1 | |F2/f2| | F2/f3 |
|---|---|---|---|---|---|
| 0.22 | 0.72 | 0.03 | 2.86 | 4.00 | 1.54 |

As apparent from the above, the lens system shown in FIG. 11 satisfies the conditions (I)–(VI). Together, the lens components L2, L3 and L5 are made of fluorite glass and the lens components L1 L4 and L6 and the cover plate G4 are made of silicate glass. The dispersion is different between the first and second lens components L3 and L4 and between the second and third lens components L4 and L5.

Figure 12:
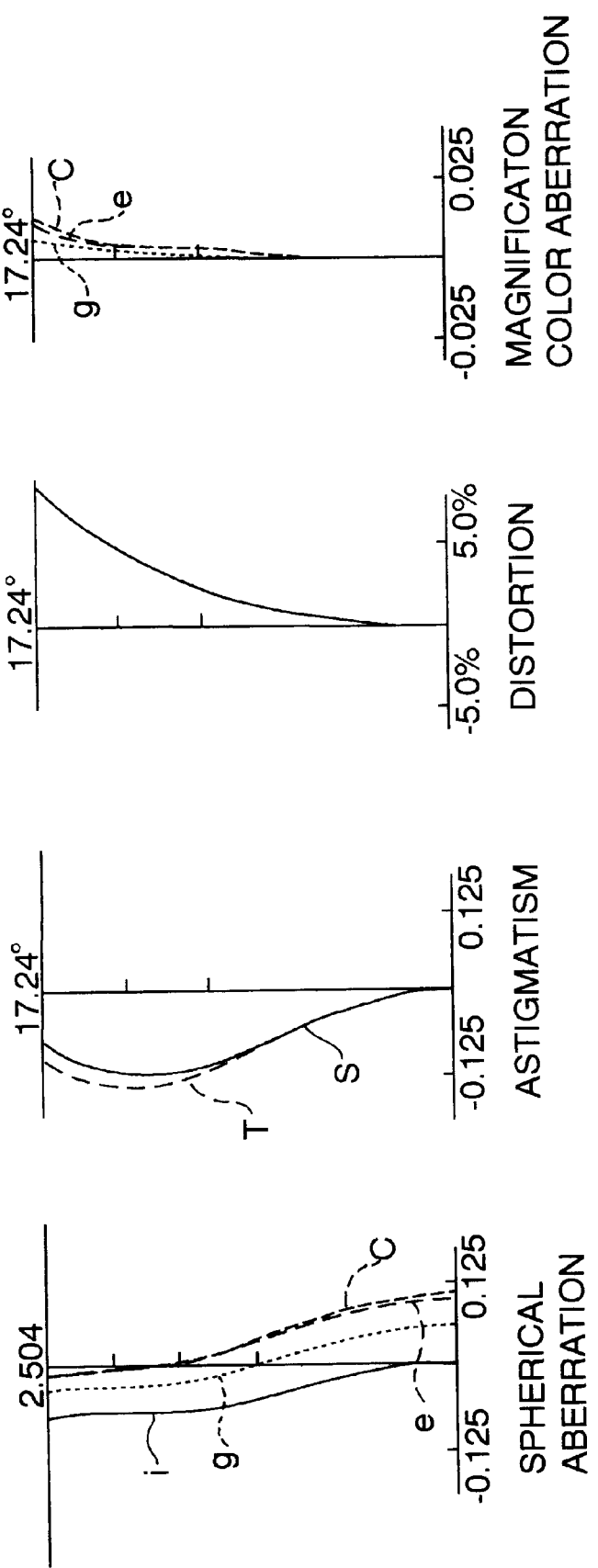
FIG. 12 shows diagrams of spherical aberration, astigmatism, distortion and magnification color aberration of the lens system of FIG. 11.

FIG. 12 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 11. As apparent in FIG. 12, the lens system has superior correction for these aberrations.

Figure 13:
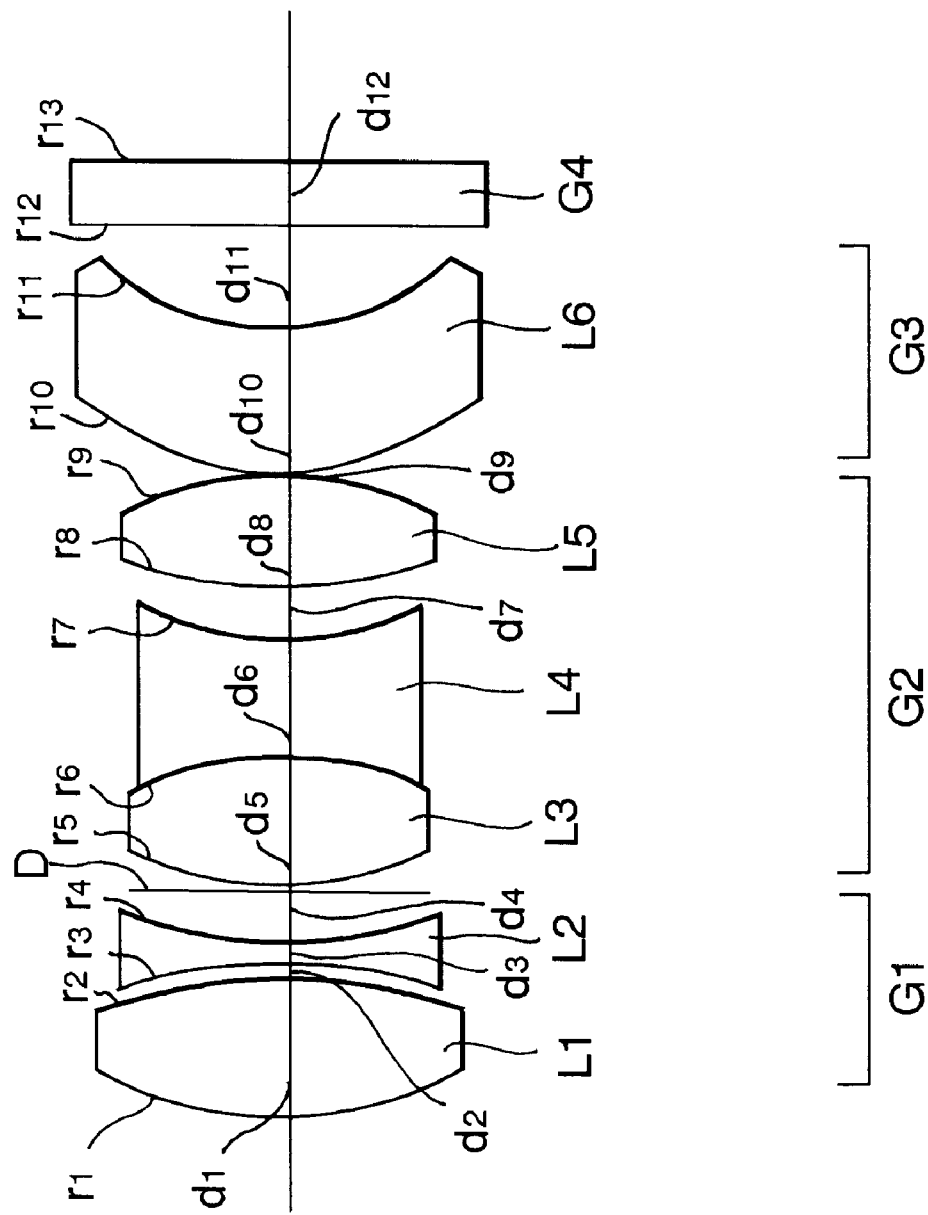
FIG. 13 is a diagrammatic side view of a lens system of a seventh embodiment of the present invention.

FIG. 13 shows a third version of the second embodiment of the present invention in which a lens stop D is stationarily disposed at a distance of 0.3 mm in front of the object end surface of the third lens component L3. The third lens group G3 comprises a single lens component L6.

The lens system as shown in FIG. 13 is substantially described in Table VII.

TABLE VII

F No. = 2.5 Angle of View = 34.50°

| Component | | Radius of Curvature (mm) | Axial Distance Between Surfaces (mm) | N |
|---|---|---|---|---|
| L1 | S1 | $r_1$ = 14.7844 | $d_1$ = 4.0110 | 1.47454 |
| | S2 | $r_2$ = −20.4636 | $d_2$ = 0.4906 | |
| L2 | S3 | $r_3$ = −18.2579 | $d_3$ = 1.0000 | 1.44491 |
| | S4 | $r_4$ = 32.3312 | $d_4$ 2.0142 | |
| L3 | S5 | $r_5$ = 10.4750 | $d_5$ = 4.6115 | 1.44491 |
| | S6 | $r_6$ = −7.5771 | $d_6$ = 0 | |
| L4 | S7 | $r_7$ = −7.5771 | $d_7$ = 3.5961 | 1.47454 |
| | S8 | $r_8$ = 7.6524 | $d_8$ = 1.5227 | |
| L5 | S9 | $r_9$ = 43.7342 | $d_9$ = 2.9291 | 1.44491 |
| | S10 | $r_{10}$ = −17.1000 | $d_{10}$ = 0.1000 | |
| L6 | S11 | $r_{11}$ = 8.7618 | $d_{11}$ = 5.0002 | 1.47454 |
| | S12 | $r_{12}$ = 7.4823 | $d_{12}$ = 2.0000 | |
| G4 | S13 | $r_{13}$ = ∞ | $d_{13}$ = 2.5500 | 1.47454 |
| | S14 | $r_{14}$ = ∞ | | |

| F | F1 | F2 | F3 | f1 | f2 | f3 |
|---|---|---|---|---|---|---|
| 25.75 | 71.528 | 50.490 | 429.167 | 10.607 | −7.570 | 27.742 |

The lens system depicted in FIG. 13 and described in Table VII has the following parameters described as follows:

| F/F1 | F/F2 | F/F3 | F2/f1 | |F2/f2| | F2/f3 |
|---|---|---|---|---|---|
| 0.36 | 0.51 | 0.06 | 4.76 | 6.67 | 1.82 |

As apparent from the above, the lens system shown in FIG. 13 satisfies the conditions (I)–(VI). Together, the lens components L2, L3 and L5 are made of fluorite glass and the lens components L1, L4 and L6 and the cover plate G4 are made of silicate glass. The dispersion is different between the first and second lens components L3 and L4 and between the second and third lens components L4 and L5.

Figure 14:
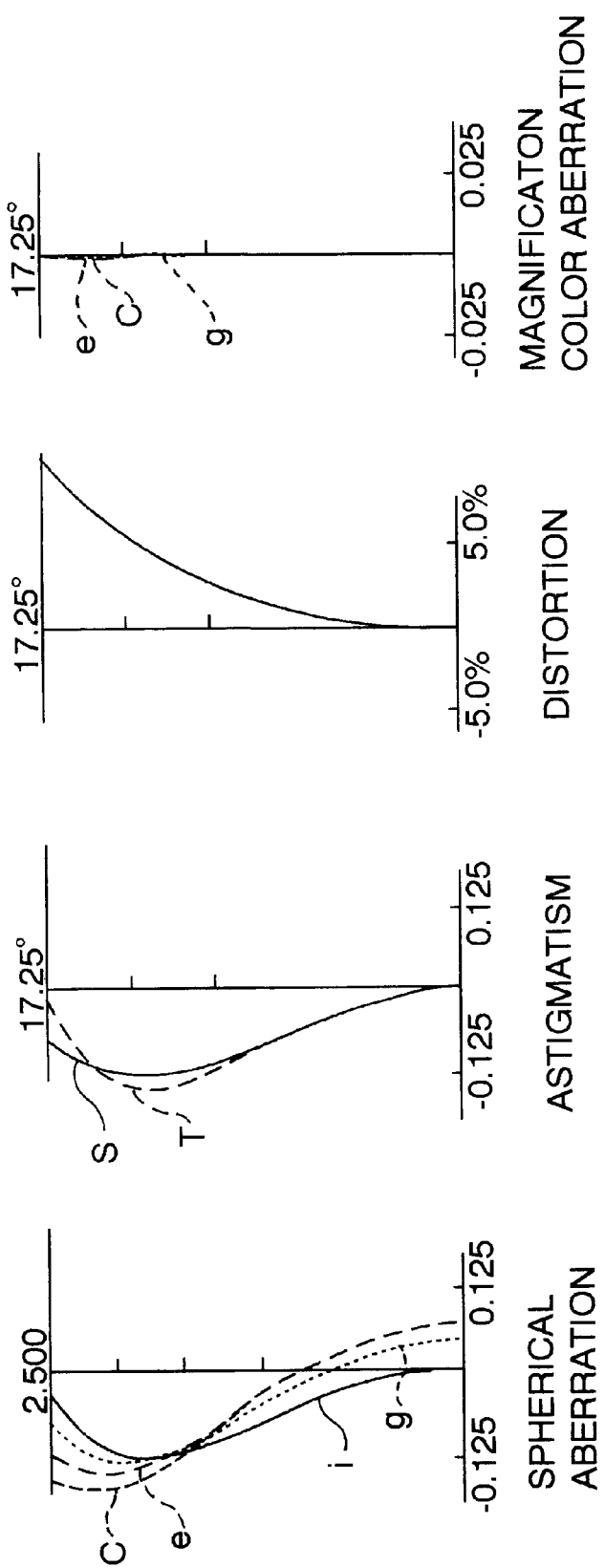
FIG. 14 shows diagrams of spherical aberration, astigmatism, distortion and magnification color aberration of the lens system of FIG. 13.

FIG. 14 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 13. As apparent in FIG. 14, the lens system has superior correction for these aberrations.

Figure 15:
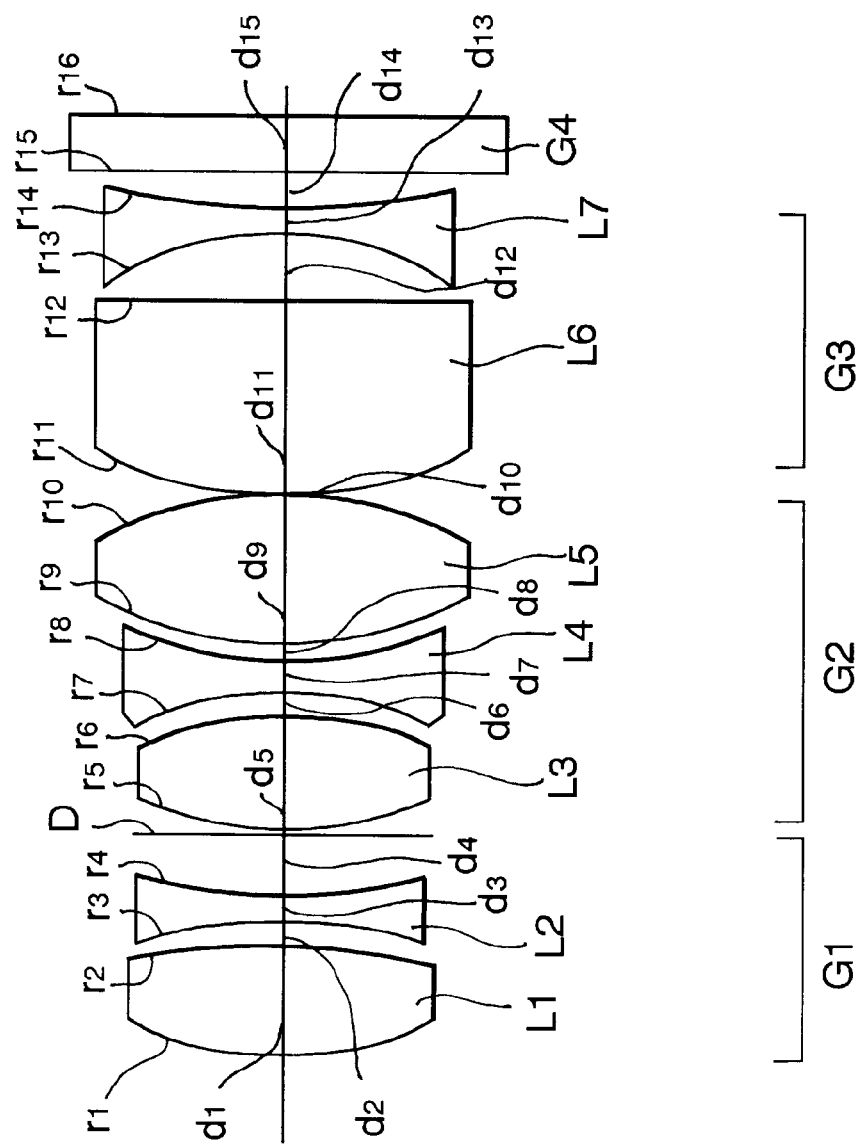
FIG. 15 is a diagrammatic side view of a lens system of a eighth embodiment of the present invention.

FIG. 15 shows a fourth version of the second embodiment of the present invention in which a lens stop D is stationarily disposed at a distance of 0.5002 mm in front of the object end surface of the third lens component L3. The third lens group G3 comprises sixth and seventh lens components L6 and L7.

The lens system as shown in FIG. 15 is substantially described in Table VIII.

TABLE VIII

F No. = 2.5 Angle of View = 34.52°

| Component | | Radius of Curvature (mm) | Axial Distance Between Surfaces (mm) | N |
|---|---|---|---|---|
| L1 | S1 | $r_1$ = 15.2843 | $d_1$ = 3.2729 | 1.47454 |
| | S2 | $r_2$ = −39.1538 | $d_2$ = 0.8806 | |
| L2 | S3 | $r_3$ = −17.6291 | $d_3$ = 1.0014 | 1.44491 |
| | S4 | $r_4$ = 19.6384 | $d_4$ = 2.4132 | |
| L3 | S5 | $r_5$ = 15.3904 | $d_5$ = 4.0135 | 1.44491 |
| | S6 | $r_6$ = −10.1601 | $d_6$ = 0.7501 | |
| L4 | S7 | $r_7$ = −8.9005 | $d_7$ = 0.9999 | 1.47454 |
| | S8 | $r_8$ = 13.9973 | $d_8$ = 0.7501 | |
| L5 | S9 | $r_9$ = 14.4284 | $d_9$ = 5.2275 | 1.44491 |
| | S10 | $r_{10}$ = −13.4599 | $d_{10}$ = 0.0998 | |
| L6 | S11 | $r_{11}$ = 16.0753 | $d_{11}$ = 7.1184 | 1.47454 |
| | S12 | $r_{12}$ = −81.3659 | $d_{12}$ = 2.0295 | |
| L7 | S13 | $r_{13}$ = −10.3278 | $d_{13}$ = 0.9998 | 1.47454 |
| | S14 | $r_{14}$ = 24.4406 | $d_{14}$ = 2.0000 | |
| G4 | S15 | $r_{15}$ = ∞ | $d_{15}$ = 2.5500 | 1.47454 |
| | S16 | $r_{16}$ = ∞ | | |

| F | F1 | F2 | F3 | f1 | f2 | f3 |
|---|---|---|---|---|---|---|
| 25.75 | −160.938 | 21.639 | −50.490 | 14.523 | −11.270 | 16.645 |

The lens system depicted in FIG. 15 and described in Table VIII has the following parameters described as follows:

| F/F1 | F/F2 | F/F3 | F2/f1 | |F2/f2| | F2/f3 |
|---|---|---|---|---|---|
| −0.16 | 1.19 | −0.51 | 1.49 | 1.92 | 1.30 |

As apparent from the above, the lens system shown in FIG. 15 satisfies the conditions (I)–(VI). Together, the lens components L2, L4 and L6 are made of fluorite glass and the lens components L1, L3, L5 and L7 and the cover plate G4 are made of silicate glass. The dispersion is different between the first and second lens components L3 and L4 and between the second and third lens components L4 and L5.

Figure 16:
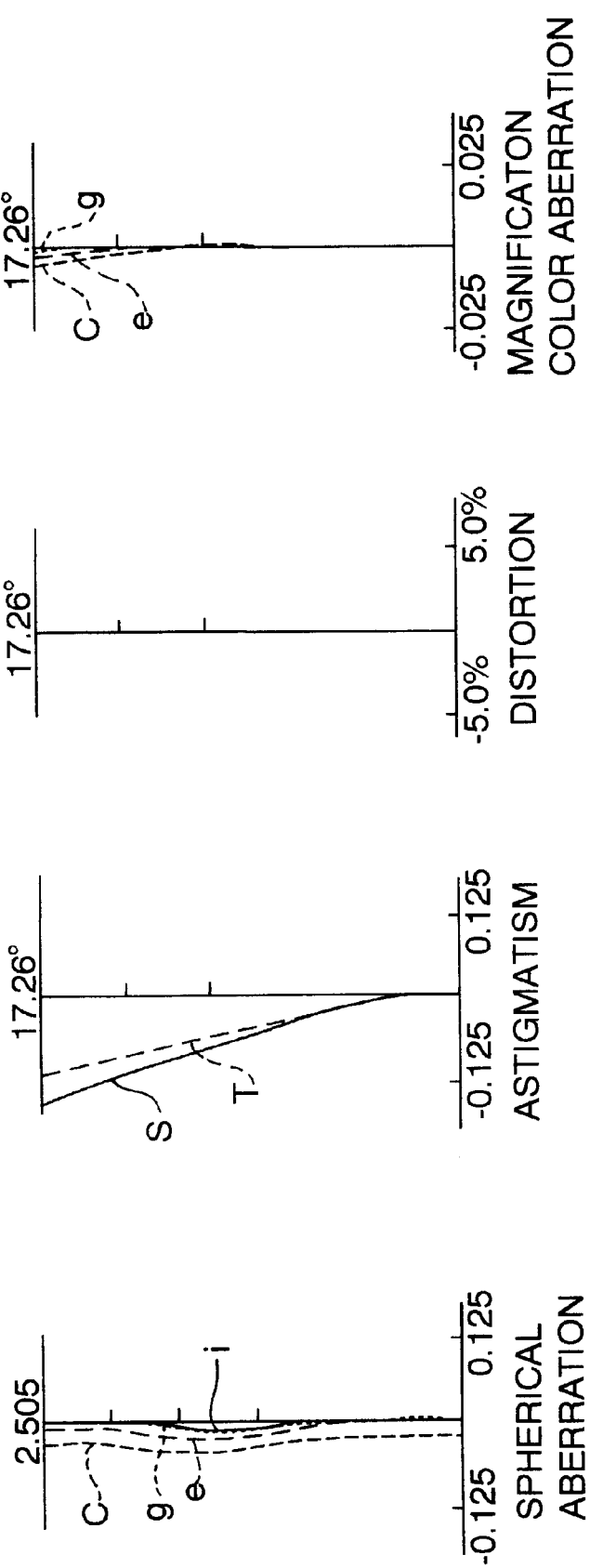
FIG. 16 shows diagrams of spherical aberration, astigmatism, distortion and magnification color aberration of the lens system of FIG. 15.

FIG. 16 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 15. As apparent in FIG. 16, the lens system has superior correction for these aberrations.

Figure 17:
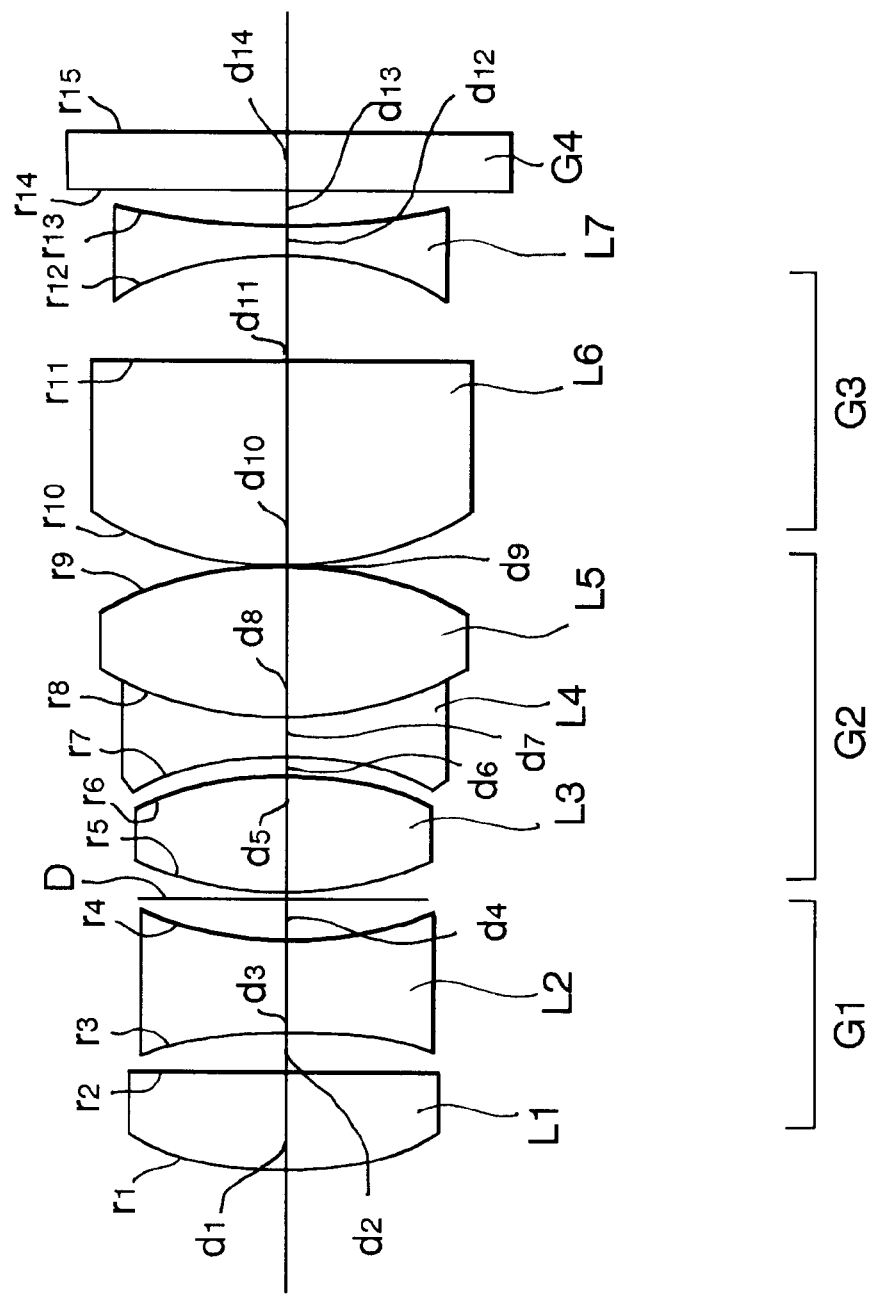
FIG. 17 is a diagrammatic side view of a lens system of a ninth embodiment of the present invention.

FIG. 17 shows a fourth version of the second embodiment of the present invention in which a lens stop D is stationarily disposed at distance of 0.5000 mm in front of the object end surface of the third lens component L3. The second lens group G2 includes doublet comprising a fourth and fifth lens components L4 and L5 cemented together. The third lens group G3 comprises a sixth and seventh lens components L6 and L7.

The lens system as shown in FIG. 17 is substantially described in Table IX.

TABLE IX

F No. = 2.502 Angle of View = 34.50°

| Component | | Radius of Curvature (mm) | Axial Distance Between Surfaces (mm) | N |
|---|---|---|---|---|
| L1 | S1 | $r_1$ = 13.6448 | | |
| | | | $d_1$ = 3.2767 | 1.47454 |
| | S2 | $r_2$ = −153.8442 | | |
| | | | $d_2$ = 1.1951 | |
| L2 | S3 | $r_3$ = −20.2033 | | |
| | | | $d_3$ = 3.0628 | 1.44491 |
| | S4 | $r_4$ = 11.3635 | | |
| | | | $d_4$ = 2.0021 | |
| L3 | S5 | $r_5$ = 12.2834 | | |
| | | | $d_5$ = 4.4735 | 1.44491 |
| | S6 | $r_6$ = −10.0271 | | |
| | | | $d_6$ = 0.7629 | |
| L4 | S7 | $r_7$ = −8.9750 | | |
| | | | $d_7$ = 1.0000 | 1.47454 |
| | S8 | $r_8$ = 16.8757 | | |
| | | | $d_8$ = 0 | |
| L5 | S9 | $r_9$ = 16.8757 | | |
| | | | $d_9$ = 4.5733 | 1.44491 |
| | S10 | $r_{10}$ = −14.4174 | | |
| | | | $d_{10}$ = 0.1000 | |
| L6 | S11 | $r_{11}$ = 13.8753 | | |
| | | | $d_{11}$ = 6.7028 | 1.47454 |
| | S12 | $r_{12}$ = −57.8863 | | |
| | | | $d_{12}$ = 3.3926 | |
| L7 | S13 | $r_{13}$ = −10.7576 | | |
| | | | $d_{13}$ = 1.0000 | 1.47454 |
| | S14 | $r_{14}$ = 24.4074 | | |
| | | | $d_{14}$ = 2.0000 | |
| G4 | S15 | $r_{15}$ = ∞ | | |
| | | | $d_{15}$ = 2.5500 | 1.47454 |
| | S16 | $r_{16}$ = ∞ | | |

| F | F1 | F2 | F3 | f1 | f2 | f3 |
|---|---|---|---|---|---|---|
| 25.75 | −46.818 | 19.074 | −198.077 | 13.154 | −12.227 | 18.340 |

The lens system depicted in FIG. 15 and described in Table VIII has the following parameters described as follows:

| F/F1 | F/F2 | F/F3 | F2/f1 | |F2/f2| | F2/f3 |
|---|---|---|---|---|---|
| −0.55 | 1.35 | −0.13 | 1.45 | 1.56 | 1.04 |

As apparent from the above, the lens system shown in FIG. 17 satisfies the conditions (I)–(VI). Together, the lens components L2, L4 and L6 are made of fluorite glass and the lens components L1, L3, L5 and L7 and the cover plate G4 are made of silicate glass. The dispersion is different between the first and second lens components L3 and L4 and between the second and third lens components L4 and L5.

Figure 18:
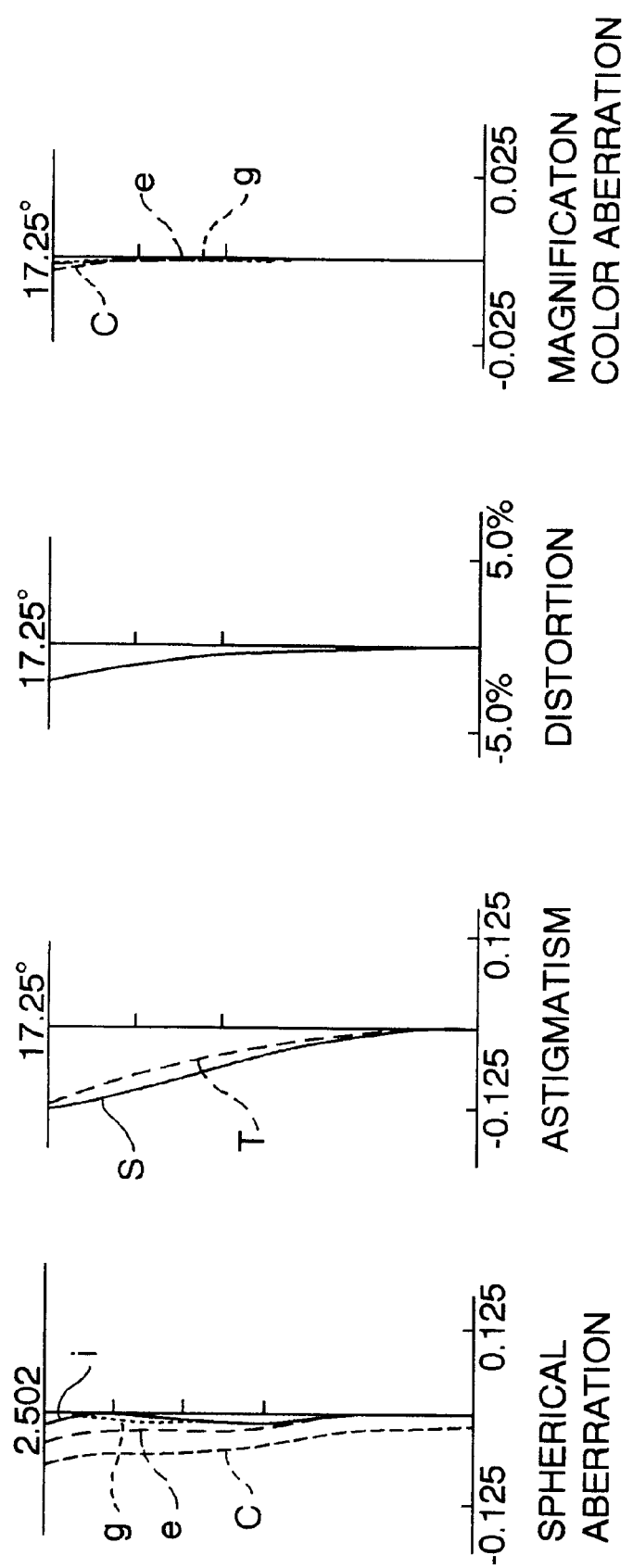
FIG. 18 shows diagrams of spherical aberration, astigmatism, distortion and magnification color aberration of the lens system of FIG. 17.

FIG. 18 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 17. As apparent in FIG. 18, the lens system has superior correction for these aberrations.

FIGS. 19–22 show various versions of a third embodiment of the present invention. The lens systems are composed of three lens groups, namely first and second and third lens groups G1, G2 and G3 arranged along the optical axis X in order from the object end to the image end. The first lens group G1 comprises three, namely, in order from the object end, first, second and third, lens components L1, L2 and L3. The second lens group G2 comprises three, namely, in order from the object end, a fourth bi-convex lens component L4, a fifth bi-concave lens component L5 and a sixth bi-convex lens component L6. The third lens group G3 comprises one or two, namely seventh and eighth, lens component L7 and L8. A lens stop D is stationarily disposed between the first and second lens groups G1 and G2. A parallel flat cover plate G4 is disposed at a certain distance behind the image end surface of the seventh or eighth lens component L7 or L8. These optical components including the lens components L1–L8 and the parallel flat cover plate G4 are in fixed relation.

Figure 19:
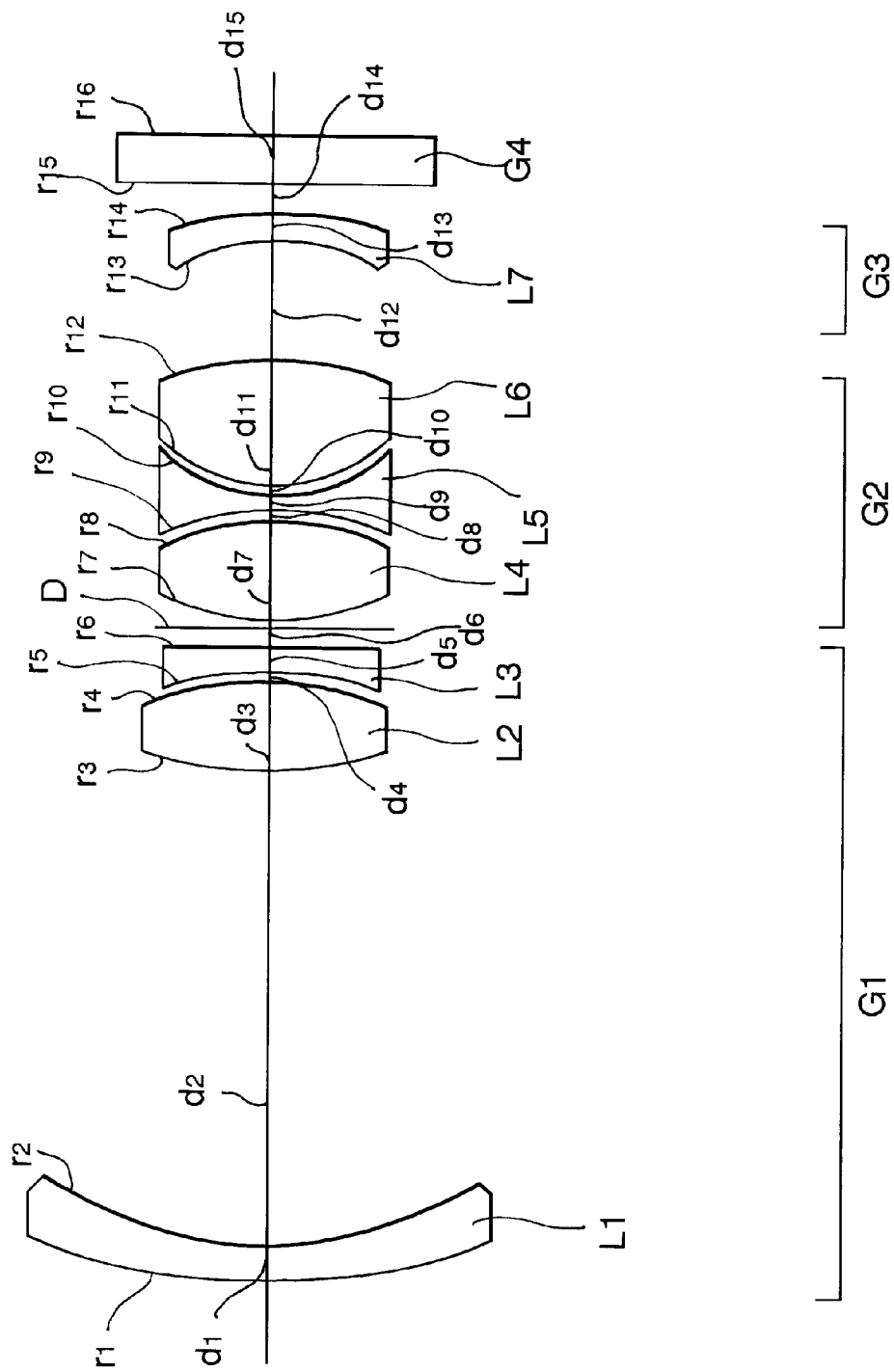
FIG. 19 is a diagrammatic side view of a lens system of a tenth embodiment of the present invention.

FIG. 19 shows a first version of the third embodiment of the present invention in which a lens stop D is stationarily disposed at a distance of 0.5001 mm in front of the object end surface of the fourth lens component L4. The third lens group G3 comprises a seventh single lens components L7.

The lens system as shown in FIG. 19 is substantially described in Table X.

TABLE X

F No. = 2.504 Angle of View = 34.50°

| Component | | Radius of Curvature (mm) | Axial Distance Between Surfaces (mm) | N |
|---|---|---|---|---|
| L1 | S1 | $r_1$ = 28.1052 | | |
| | | | $d_1$ = 2.0000 | 1.47454 |
| | S2 | $r_2$ = 19.1933 | | |
| | | | $d_2$ = 25.0000 | |
| L2 | S3 | $r_3$ = 20.7703 | | |
| | | | $d_3$ = 4.3030 | 1.44491 |
| | S4 | $r_4$ = −15.9983 | | |
| | | | $d_4$ = 0.5844 | |
| L3 | S5 | $r_5$ = −13.6918 | | |
| | | | $d_5$ = 1.0000 | 1.44491 |
| | S6 | $r_6$ = 112.4142 | | |
| | | | $d_6$ = 1.50001 | |
| L4 | S7 | $r_7$ = 12.6673 | | |
| | | | $d_7$ = 4.9154 | 1.47454 |
| | S8 | $r_8$ = −12.7708 | | |
| | | | $d_8$ = 0.5843 | |
| L5 | S9 | $r_9$ = −11.2291 | | |
| | | | $d_9$ = 1.0000 | 1.44491 |
| | S10 | $r_{10}$ = 9.2240 | | |
| | | | $d_{10}$ = 0.5001 | |
| L6 | S11 | $r_{11}$ = 9.3296 | | |
| | | | $d_{11}$ = 6.1444 | 1.47454 |
| | S12 | $r_{12}$ = −15.4457 | | |
| | | | $d_{12}$ = 6.2607 | |
| L7 | S13 | $r_{13}$ = −6.8811 | | |
| | | | $d_{13}$ = 1.2501 | 1.47454 |
| | S14 | $r_{14}$ = −22.0059 | | |
| | | | $d_{14}$ = 2.0000 | |
| G4 | S15 | $r_{15}$ = ∞ | | |
| | | | $d_{15}$ = 2.5500 | 1.47454 |
| | S16 | $r_{16}$ = ∞ | | |

| F | F1 | F2 | F3 | f1 | f2 | f3 |
|---|---|---|---|---|---|---|
| 25.75 | 151.471 | 20.935 | −21.639 | 15.281 | −10.681 | 14.241 |

The lens system depicted in FIG. 19 and described in Table X has the following parameters described as follows:

| F/F1 | F/F2 | F/F3 | F2/f1 | |F2/f2| | F2/f3 |
|---|---|---|---|---|---|
| 0.17 | 1.23 | −1.19 | 1.37 | 1.96 | 1.47 |

As apparent from the above, the lens system shown in FIG. 19 satisfies the conditions (I)–(VI). Together, the lens components L2, L4 and L6 are made of fluorite glass and the lens components L1, L3, L5 and L7 and the cover plate G4 are made of silicate glass. The dispersion is different between the first and second lens components L4 and L5 and between the second and third lens components L5 and L6.

Figure 20:
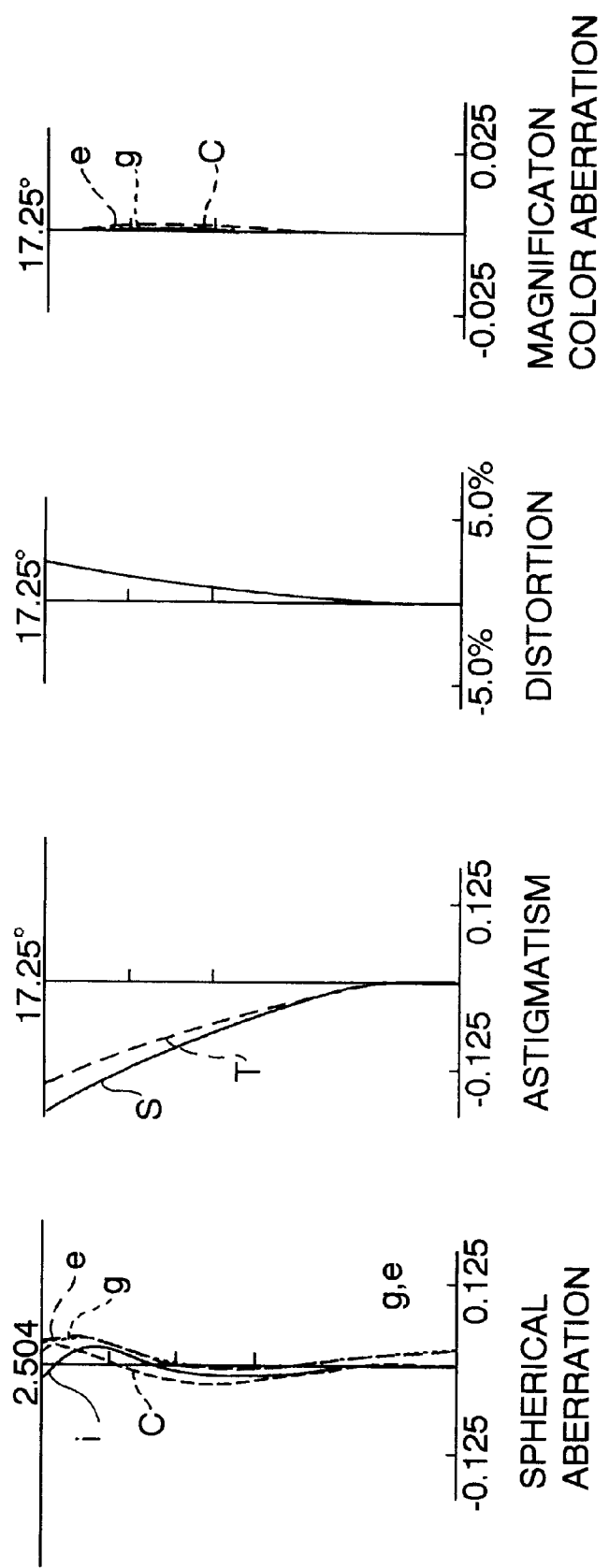
FIG. 20 shows diagrams of spherical aberration, astigmatism, distortion and magnification color aberration of the lens system of FIG. 19.

FIG. 20 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 19. As apparent in FIG. 20, the lens system has superior correction for these aberrations.

Figure 21:
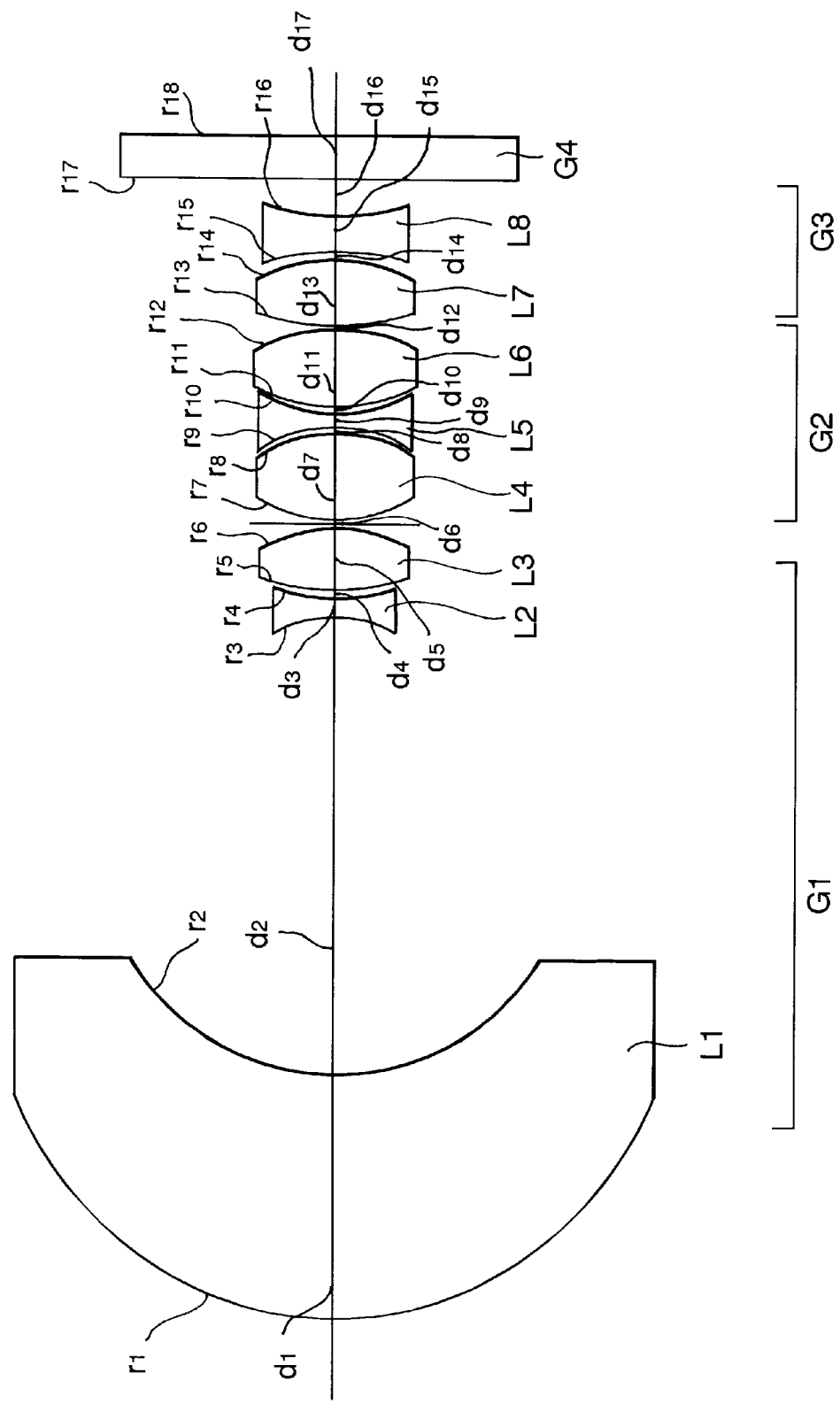
FIG. 21 is a diagrammatic side view of a lens system of an eleventh embodiment of the present invention.

FIG. 21 shows a second version of the third embodiment of the present invention in which a lens stop D is stationarily disposed at a distance of 0.5000 mm in front of the object end surface of the fourth lens component L4. The third lens group G3 comprises seventh and eighth lens components L7 and L8.

The lens system as shown in FIG. 21 is substantially described in Table XI.

TABLE XI

F No. = 2.059  Angle of View = 41.80°

| Component | | Radius of Curvature (mm) | Axial Distance Between Surfaces (mm) | N |
|---|---|---|---|---|
| L$_1$ | S1 | r$_1$ = 18.8353 | | |
| | | | d$_1$ = 12.43353 | 1.47454 |
| | S2 | r$_2$ = 13.0019 | | |
| | | | d$_2$ = 23.83678 | |
| L$_2$ | S3 | r$_3$ = −8.0093 | | |
| | | | d$_3$ = 0.99913 | 1.44491 |
| | S4 | r$_4$ = 9.8105 | | |
| | | | d$_4$ = 0.63775 | |
| L$_3$ | S5 | r$_5$ = 19.8380 | | |
| | | | d$_5$ = 3.30476 | 1.44491 |
| | S6 | r$_6$ = −8.6331 | | |
| | | | d$_6$ = 1.00041 | |
| L$_4$ | S7 | r$_7$ = 9.3566 | | |
| | | | d$_7$ = 3.93042 | 1.47454 |
| | S8 | r$_8$ = −8.1667 | | |
| | | | d$_8$ = 0.49975 | |
| L$_5$ | S9 | r$_9$ = −7.0495 | | |
| | | | d$_9$ = 0.99974 | 1.44491 |
| | S10 | r$_{10}$ = 8.3375 | | |
| | | | d$_{10}$ = 0.50078 | |
| L$_6$ | S11 | r$_{11}$ = 8.8786 | | |
| | | | d$_{11}$ = 4.05854 | 1.47454 |
| | S12 | r$_{12}$ = −9.1986 | | |
| | | | d$_{12}$ = 0.09991 | |
| L$_7$ | S13 | r$_{13}$ = 18.7655 | | |
| | | | d$_{13}$ = 3.28991 | 1.47454 |
| | S14 | r$_{14}$ = −10.4052 | | |
| | | | d$_{14}$ = 0.75135 | |
| L$_8$ | S15 | r$_{15}$ = −7.0579 | | |
| | | | d$_{15}$ = 1.56100 | 1.47454 |
| | S16 | r$_{16}$ = 33.8019 | | |
| | | | d$_{16}$ = 2.0000 | |
| G4 | S17 | r$_{17}$ = ∞ | | |
| | | | d$_{17}$ = 2.5500 | 1.47454 |
| | S18 | r$_{18}$ = ∞ | | |

| F | F1 | F2 | F3 | f1 | f2 | f3 |
|---|---|---|---|---|---|---|
| 14.38 | −55.308 | 14.673 | −110.615 | 10.556 | −7.931 | 10.869 |

The lens system depicted in FIG. 21 and described in Table VIII has the following parameters described as follows:

| F/F1 | F/F2 | F/F3 | F2/f1 | |F2/f2| | F2/f3 |
|---|---|---|---|---|---|
| −0.26 | 0.98 | −0.13 | 1.39 | 1.85 | 1.35 |

As apparent from the above, the lens system shown in FIG. 19 satisfies the conditions (I)–(VI). Together, the lens components L3, L4, L6 and L7 are made of fluorite glass and the lens components L1, L2, L5 and L8 and the cover plate G4 are made of silicate glass. The dispersion is different between the first and second lens components L4 and L5 and between the second and third lens components L5 and L6.

Figure 22:
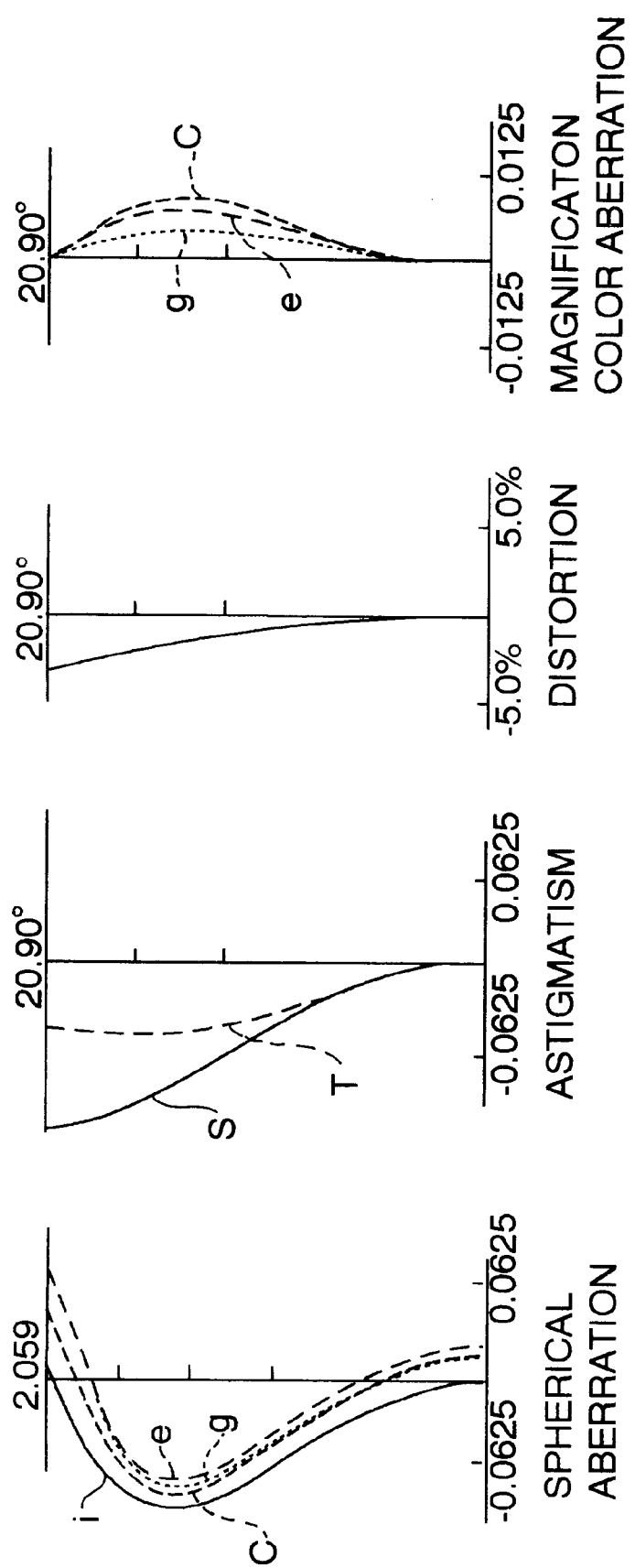
FIG. 22 shows diagrams of spherical aberration, astigmatism, distortion and magnification color aberration of the lens system of FIG. 21.

FIG. 22 shows diagrams illustrating aberrations, such as spherical aberrations for i-, g-, e- and C-spectra, sagittal and tangential astigmatism, distortion for i-spectrum and magnification color aberrations for g-, e- and C-spectra of the lens system shown in FIG. 21. As apparent in FIG. 22, the lens system has superior correction for these aberrations.

As apparent from the above embodiments, the lens system of the present invention may be designed for a wide range of angles of view by satisfying the above conditions.

Figure 23:
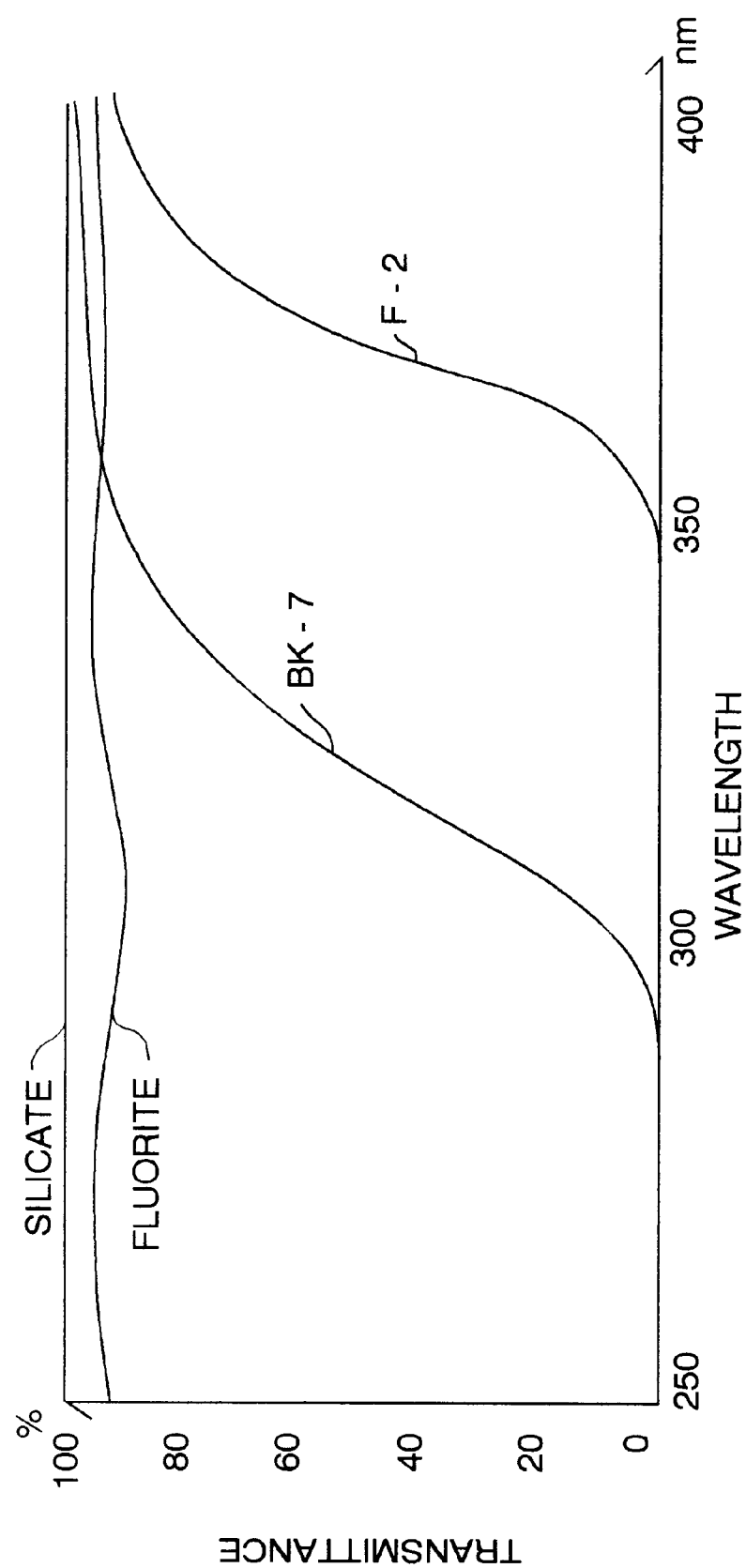
FIG. 23 shows a diagram of transmittance of various glass.

FIG. 23 shows transmittance of various glass materials including fluorite glass and silicate glass. The transmittance was measured with various parallel plates of a thickness of 10 mm. As apparent from FIG. 23, each of the fluorite glass and silicate glass has a transmittance greatly higher over a range of ultraviolet rays than glass materials such as BK-7 and BK-2 which are general as optical lens materials. Specifically, the transmittance of each of the fluorite glass and silicate glass is higher than 80% over a range of wavelength from 300 to 400 nm. Though not shown in FIG. 23, each of the fluorite glass and silicate glass has a transmittance higher than 80% over a range of wavelength from 400 to 800 nm. Practically, the lens system may be designed with well corrected aberrations as long as lens components made of materials having transmittance higher than 50% for visible rays and ultraviolet rays are used.

Generally, the smaller the difference in dispersion among materials of lens components is, the harder the lens system is corrected in aberrations.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A fixed focal length wide angle image forming optical lens system comprising in order from the object end a first lens group of at least two components, a second lens group which has a positive focal length and comprises in order from the object end a first component of positive power, a second component of negative power and a third component of positive power, and a third lens group of at least one component, said optical lens system satisfying the following conditions:

$$-0.75 < F/F1 < 0.75$$

$$0.3 < F/F2 < 1.55$$

$$-1.50 < F/F3 < 0.15$$

$$0.9 < F2/f1 < 5.0$$

$$1.2 < |F2/f2| < 7$$

$$0.9 < F2/f3 < 2.4$$

where F is the overall focal length of the lens system, F1, F2 and F3 are the focal length of the first, second and third lens groups, respectively, and f1, f2 and f3 are the focal length of the first, second and third components of the second lens group, respectively wherein all lens component materials have dispersion differences of no greater than 0.0055.

2. An image forming optical lens system as defined in claim 1, further comprising a lens stop disposed between said two components of said first lens group.

3. An image forming optical lens system as defined in claim 2 substantially as described:

| Component | | Radius of Curvature (mm) | Axial Distance Between Surfaces (mm) | N |
|---|---|---|---|---|
| | | F No. = 2.5 Angle of View = 34.48° | | |
| $L_1$ | S1 | $r_1 = 23.9660$ | $d_1 = 9.9262$ | 1.47454 |
| | S2 | $r_2 = 11.2800$ | $d_2 = 25.9857$ | |
| $L_2$ | S3 | $r_3 = -52.4481$ | $d_3 = 3.7473$ | 1.44491 |
| | S4 | $r_4 = -22.0621$ | $d_4 = 0.1$ | |
| $L_3$ | S5 | $r_5 = 15.9527$ | $d_5 = 5.4006$ | 1.44491 |
| | S6 | $r_6 = -16.6354$ | $d_6 = 0.7501$ | |
| $L_4$ | S7 | $r_7 = -13.0937$ | $d_7 = 1.0$ | 1.47454 |
| | S8 | $r_8 = 9.5032$ | $d_8 = 1.0001$ | |
| $L_5$ | S9 | $r_9 = 11.3864$ | $d_9 = 6.7394$ | 1.44491 |
| | S10 | $r_{10} = -11.1132$ | $d_{10} = 0.9999$ | |
| $L_6$ | S11 | $r_{11} = -13.9526$ | $d_{11} = 1.0$ | 1.47454 |
| | S12 | $r_{12} = 9.6928$ | $d_{12} = 1.0$ | |
| $L_7$ | S13 | $r_{13} = 11.2385$ | $d_{13} = 4.8019$ | 1.44491 |
| | S14 | $r_{14} = \infty$ | $d_{14} = 2.0$ | |
| G4 | S15 | $r_{15} = \infty$ | $d_{15} = 2.55$ | 1.47454 |
| | S16 | $r_{16} = \infty$ | | |

| F | F1 | F2 | F3 | f1 | f2 | f3 |
|---|---|---|---|---|---|---|
| 25.76 | 57.244 | 22.4 | −24.769 | 19.31 | −11.429 | 13.913 | where the optical lens system comprises lens components L1 to L7 and an optical component G4 having surfaces S1 to S16, and the radius of each surface is given by r followed by an arabic numeral progressively from the object and to the image end of the lens system, and N is defined as a refractive index of the lens material.

4. An image forming optical lens system as defined in claim 2 substantially as described:

| Component | | Radius of Curvature (mm) | Axial Distance Between Surfaces (mm) | N |
|---|---|---|---|---|
| | | F No. = 2.5 Angle of View = 34.50° | | |
| $L_1$ | S1 | $r_1 = 22.6687$ | $d_1 = 10.000$ | 1.47454 |
| | S2 | $r_2 = 10.5512$ | $d_2 = 26.3689$ | |
| $L_2$ | S3 | $r_3 = 212.6157$ | $d_3 = 3.7200$ | 1.44491 |
| | S4 | $r_4 = -17.9567$ | $d_4 = 0.100$ | |
| $L_3$ | S5 | $r_5 = 17.2749$ | $d_5 = 5.0841$ | 1.44491 |
| | S6 | $r_6 = -17.7102$ | $d_6 = 0.7500$ | |
| $L_4$ | S7 | $r_7 = -14.0756$ | $d_7 = 1.0000$ | 1.47454 |
| | S8 | $r_8 = 8.164$ | $d_8 = 0$ | |
| $L_5$ | S9 | $r_9 = 8.164$ | $d_9 = 8.3860$ | 1.44491 |
| | S10 | $r_{10} = -11.8778$ | $d_{10} = 0.9999$ | |
| $L_6$ | S11 | $r_{11} = -12.4212$ | $d_{11} = 1.0000$ | 1.47454 |
| | S12 | $r_{12} = 10.6415$ | $d_{12} = 1.0000$ | |
| $L_7$ | S13 | $r_{13} = 11.8335$ | $d_{13} = 4.0417$ | 1.44491 |
| | S14 | $r_{14} = -1764.3175$ | $d_{14} = 2.0000$ | |
| G4 | S15 | $r_{15} = \infty$ | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.75 | 52.551 | 22.391 | −23.624 | 20.542 | −10.765 | 12.509 | where the optical lens system comprises lens components L1 to L7 and an optical component G4 having surfaces S1 to S16, and the radius of each surface is given by r followed by an arabic numeral progressively from the object end to the image end of the lens system, and N is defined as a refractive index of the lens material.

5. An image forming optical lens system as defined in claim 2, substantially as described:

| Component | | Radius of Curvature (mm) | Axial Distance Between Surfaces (mm) | N |
|---|---|---|---|---|
| | | F No. = 2.5 Angle of View = 34.48° | | |
| $L_1$ | S1 | $r_1 = 24.9171$ | $d_1 = 9.9358$ | 1.47454 |
| | S2 | $r_2 = 11.4855$ | $d_2 = 26.4008$ | |
| $L_2$ | S3 | $r_3 = 320.9305$ | $d_3 = 3.567$ | 1.44491 |
| | S4 | $r_4 = -19.9207$ | $d_4 = 0.1001$ | |
| $L_3$ | S5 | $r_5 = 13.9293$ | $d_5 = 6.6087$ | 1.44491 |
| | S6 | $r_6 = -13.2100$ | $d_6 = 0$ | |
| $L_4$ | S7 | $r_7 = -13.2100$ | $d_7 = 1.0131$ | 1.47454 |
| | S8 | $r_8 = 9.6419$ | $d_8 = 1.0061$ | |
| $L_5$ | S9 | $r_9 = 9.8346$ | $d_9 = 6.3403$ | 1.44491 |
| | S10 | $r_{10} = -14.4150$ | $d_{10} = 1.0033$ | |
| $L_6$ | S11 | $r_{11} = -11.8551$ | $d_{11} = 1.0006$ | 1.47454 |
| | S12 | $r_{12} = 9.5828$ | $d_{12} = 1.0031$ | |
| $L_7$ | S13 | $r_{13} = 11.6447$ | $d_{13} = 3.8428$ | 1.44491 |
| | S14 | $r_{14} = -7240.6751$ | $d_{14} = 2.0000$ | |
| G4 | S15 | $r_{15} = \infty$ | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.76 | 66.051 | 20.125 | −20.608 | 16.496 | −11.5 | 14.273 | where the optical lens system comprises lens components L1 to L7 and an optical component G4 having surfaces S1 to S16, and the radius of each surface is given by r followed by an arabic numeral progressively from the object end to the image end of the lens system, and N is defined as a refractive index of the lens material.

6. An image forming optical lens system as defined in claim 2, substantially as described:

F No. = 2.5 Angle of View = 34.50°

| Component | | Radius of Curvature (mm) | Axial Distance Between Surfaces (mm) | N |
|---|---|---|---|---|
| $L_1$ | S1 | $r_1 = 22.4734$ | $d_1 = 10.0088$ | 1.47454 |
| | S2 | $r_2 = 11.0857$ | $d_2 = 23.4071$ | |
| $L_2$ | S3 | $r_3 = 132.1196$ | $d_3 = 3.4406$ | 1.44491 |
| | S4 | $r_4 = -20.0776$ | $d_4 = 0.1000$ | |
| $L_3$ | S5 | $r_5 = 14.6176$ | $d_5 = 6.1359$ | 1.44491 |
| | S6 | $r_6 = -11.7794$ | $d_6 = 0$ | |
| $L_4$ | S7 | $r_7 = -11.7794$ | $d_7 = 0.9498$ | 1.47454 |
| | S8 | $r_8 = 8.4994$ | $d_8 = 0$ | |
| $L_5$ | S9 | $r_9 = 8.4994$ | $d_9 = 6.9201$ | 1.44491 |
| | S10 | $r_{10} = -14.7415$ | $d_{10} = 1.3550$ | |
| $L_6$ | S11 | $r_{11} = -12.2623$ | $d_{11} = 4.8411$ | 1.47454 |
| | S12 | $r_{12} = 9.4213$ | $d_{12} = 1.2466$ | |
| $L_7$ | S13 | $r_{13} = 11.3787$ | $d_{13} = 4.2154$ | 1.44491 |
| | S14 | $r_{14} = 15532.5120$ | $d_{14} = 2.0000$ | |
| G4 | S15 | $r_{15} = \infty$ | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.75 | 61.310 | 21.107 | −21.458 | 15.917 | −10.148 | 13.275 | where the optical lens system comprises lens components L1 to L7 and an optical component G4 having surfaces S1 to S16, and the radius of each surface is given by r followed by an arabic numeral progressively from the object end to the image end of the lens system, and N is defined as a refractive index of the lens material.

7. An image forming optical lens system as defined in claim 1, further comprising a lens stop disposed between said first lens group and said second lens group.

8. An image forming optical lens system as defined in claim 7, substantially as described:

F No. = 2.5 Angle of View = 34.50°

| Component | | Radius of Curvature (mm) | Axial Distance Between Surfaces (mm) | N |
|---|---|---|---|---|
| $L_1$ | S1 | $r_1 = 23.8147$ | $d_1 = 1.0026$ | 1.47454 |
| | S2 | $r_2 = 10.0929$ | $d_2 = 1.2583$ | |
| $L_2$ | S3 | $r_3 = 12.4516$ | $d_3 = 4.2303$ | 1.44491 |
| | S4 | $r_4 = 142.6490$ | $d_4 = 9.3229$ | |
| $L_3$ | S5 | $r_5 = 17.2963$ | $d_5 = 3.6873$ | 1.44491 |
| | S6 | $r_6 = -12.1061$ | $d_6 = 1.2596$ | |
| $L_4$ | S7 | $r_7 = -9.8721$ | $d_7 = 1.1823$ | 1.47454 |
| | S8 | $r_8 = 9.6330$ | $d_8 = 1.2458$ | |
| $L_5$ | S9 | $r_9 = 19.9700$ | $d_9 = 4.2708$ | 1.44491 |
| | S10 | $r_{10} = -11.6384$ | $d_{10} = 0.1003$ | |
| $L_6$ | S11 | $r_{11} = 18.4670$ | $d_{11} = 5.0541$ | 1.47454 |
| | S12 | $r_{12} = -10.3953$ | $d_{12} = 0.7458$ | |
| $L_7$ | S13 | $r_{13} = -11.0881$ | $d_{13} = 5.3058$ | 1.44491 |
| | S14 | $r_{14} = 9.8022$ | $d_{14} = 2.0000$ | |
| G4 | S15 | $r_{15} = \infty$ | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.76 | 143.056 | 33.013 | −99.038 | 16.507 | −9.914 | 17.194 | where the optical lens system comprises lens components L1 to L7 and an optical component G4 having surfaces S1 to S16, and the radius of each surface is given by r followed by an arabic numeral progressively from the object end to the image end of the lens system, and N is defined as a refractive index of the lens material.

9. An image forming optical lens system as defined in claim 7 substantially as described:

F No. = 2.504 Angle of View = 34.48°

| Component | | Radius of Curvature (mm) | Axial Distance Between Surfaces (mm) | N |
|---|---|---|---|---|
| $L_1$ | S1 | $r_1 = 14.2465$ | $d_1 = 4.0484$ | 1.47454 |
| | S2 | $r_2 = -19.6229$ | $d_2 = 0.5644$ | |
| $L_2$ | S3 | $r_3 = -15.6487$ | $d_3 = 1.0000$ | 1.44491 |
| | S4 | $r_4 = 24.5485$ | $d_4 = 1.7371$ | |
| $L_3$ | S5 | $r_5 = 9.8040$ | $d_5 = 4.1775$ | 1.44491 |
| | S6 | $r_6 = -11.6842$ | $d_6 = 0.5320$ | |
| $L_4$ | S7 | $r_7 = -10.2333$ | $d_7 = 3.2945$ | 1.47454 |
| | S8 | $r_8 = 7.8683$ | $d_8 = 1.3165$ | |
| $L_5$ | S9 | $r_9 = 23.6511$ | $d_9 = 3.1266$ | 1.44491 |
| | S10 | $r_{10} = -17.6213$ | $d_{10} = 1.0506$ | |
| $L_6$ | S11 | $r_{11} = 8.8540$ | $d_{11} = 4.5398$ | 1.47454 |
| | S12 | $r_{12} = 7.5565$ | $d_{12} = 2.0000$ | |
| G4 | S13 | $r_{13} = \infty$ | $d_{13} = 2.5500$ | 1.47454 |
| | S14 | $r_{14} = \infty$ | | |

| F | F1 | F2 | F3 | f1 | f2 | f3 |
|---|---|---|---|---|---|---|
| 25.75 | 117.045 | 35.764 | 858.333 | 12.505 | −8.941 | 23.223 | where the optical lens system comprises lens components L1 to L6 and an optical component G4 having surfaces S1 to S14, and the radius of each surface is given by r followed by an arabic numeral progressively from the object end to the image end of the lens system, and N is defined as a refractive index of the lens material.

10. An image forming optical lens system as defined in claim 7 substantially as described:

| \multicolumn{5}{c}{F No. = 2.5  Angle of View = 34.50°} |
|---|---|---|---|---|
| Component | | Radius of Curvature (mm) | Axial Distance Between Surfaces (mm) | N |
| L1 | S1 | r1 = 14.7844 | d1 = 4.0110 | 1.47454 |
| | S2 | r2 = −20.4636 | d2 = 0.4906 | |
| L2 | S3 | r3 = −18.2579 | d3 = 1.0000 | 1.44491 |
| | S4 | r4 = 32.3312 | d4 = 2.0142 | |
| L3 | S5 | r5 = 10.4750 | d5 = 4.6115 | 1.44491 |
| | S6 | r6 = −7.5771 | d6 = 0 | |
| L4 | S7 | r7 = −7.5771 | d7 = 3.5961 | 1.47454 |
| | S8 | r8 = 7.6524 | d8 = 1.5227 | |
| L5 | S9 | r9 = 43.7342 | d9 = 2.9291 | 1.44491 |
| | S10 | r10 = −17.1000 | d10 = 0.1000 | |
| L6 | S11 | r11 = 8.7618 | d11 = 5.0002 | 1.47454 |
| | S12 | r12 = 7.4823 | d12 = 2.0000 | |
| G4 | S13 | r13 = ∞ | d13 = 2.5500 | 1.47454 |
| | S14 | r14 = ∞ | | |

| F | F1 | F2 | F3 | f1 | f2 | f3 |
|---|---|---|---|---|---|---|
| 25.75 | 71.528 | 50.490 | 429.167 | 10.607 | −7.570 | 27.742 | where the optical lens system comprises lens components L1 to L6 and an optical component G4 having surfaces S1 to S14, and the radius of each surface is given by r followed by an arabic numeral progressively from the object end to the image end of the lens system, and N is defined as a refractive index of the lens material.

11. An image forming optical lens system as defined in claim 7 substantially as described:

| \multicolumn{5}{c}{F No. = 2.505  Angle of View = 34.52°} |
|---|---|---|---|---|
| Component | | Radius of Curvature (mm) | Axial Distance Between Surfaces (mm) | N |
| L1 | S1 | r1 = 15.2843 | d1 = 3.2729 | 1.47454 |
| | S2 | r2 = −39.1538 | d2 = 0.8806 | |
| L2 | S3 | r3 = −17.6291 | d3 = 1.0014 | 1.44491 |
| | S4 | r4 = 19.6384 | d4 = 2.4132 | |
| L3 | S5 | r5 = 15.3904 | d5 = 4.0135 | 1.44491 |
| | S6 | r6 = −10.1601 | d6 = 0.7501 | |
| L4 | S7 | r7 = −8.9005 | d7 = 0.9999 | 1.47454 |
| | S8 | r8 = 13.9973 | d8 = 0.7501 | |
| L5 | S9 | r9 = 14.4284 | d9 = 5.2275 | 1.44491 |
| | S10 | r10 = −13.4599 | d10 = 0.0998 | |
| L6 | S11 | r11 = 16.0753 | d11 = 7.1184 | 1.47454 |
| | S12 | r12 = −81.3659 | d12 = 2.0295 | |
| L7 | S13 | r13 = −10.3278 | d13 = 0.9998 | 1.47454 |
| | S14 | r14 = 24.4406 | d14 = 2.0000 | |
| G4 | S15 | r15 = ∞ | d15 = 2.5500 | 1.47454 |
| | S16 | r16 = ∞ | | |

| F | F1 | F2 | F3 | f1 | f2 | f3 |
|---|---|---|---|---|---|---|
| 25.76 | −160.938 | 21.639 | −50.490 | 14.523 | −11.270 | 16.645 | where the optical lens system comprises lens components L1 to L7 and an optical component by G4 having surfaces S1 to S16, and the radius of each surface is given by r followed by an arabic numeral progressively from the object end to the image end of the lens system, and N is defined as a refractive index of the lens material.

12. An image forming optical lens system as defined in claim 7 substantially as described:

| \multicolumn{5}{c}{F No. = 2.502  Angle of View = 34.50°} |
|---|---|---|---|---|
| Component | | Radius of Curvature (mm) | Axial Distance Between Surfaces (mm) | N |
| L1 | S1 | r1 = 13.6448 | d1 = 3.2767 | 1.47454 |
| | S2 | r2 = −153.8442 | d2 = 1.1951 | |
| L2 | S3 | r3 = −20.2033 | d3 = 3.0628 | 1.44491 |
| | S4 | r4 = 11.3635 | d4 = 2.0021 | |
| L3 | S5 | r5 = 12.2834 | d5 = 4.4735 | 1.44491 |
| | S6 | r6 = −10.0271 | d6 = 0.7629 | |
| L4 | S7 | r7 = −8.9750 | d7 = 1.0000 | 1.47454 |
| | S8 | r8 = 16.8757 | d8 = 0 | |
| L5 | S9 | r9 = 16.8757 | d9 = 4.5733 | 1.44491 |
| | S10 | r10 = −14.4174 | d10 = 0.1000 | |
| L6 | S11 | r11 = 13.8753 | d11 = 6.7028 | 1.47454 |
| | S12 | r12 = −57.8863 | d12 = 3.3926 | |
| L7 | S13 | r13 = −10.7576 | d13 = 1.0000 | 1.47454 |
| | S14 | r14 = 28.4074 | d14 = 2.000 | |
| G4 | S15 | r15 = ∞ | d15 = 2.5500 | 1.47454 |
| | S16 | r16 = ∞ | | |

| F | F1 | F2 | F3 | f1 | f2 | f3 |
|---|---|---|---|---|---|---|
| 25.75 | −46.818 | 19.074 | −198.077 | 13.154 | −12.227 | 18.340 | where the optical lens system comprises lens components L1 to L7 and an optical component G4 having surfaces S1 to S16, and the radius of each surface is given by r followed by an arabic numeral progressively from the object end to the image end of the lens system, and N is defined as a refractive index of the lens material.

13. An image forming optical lens system as defined in claim 7 substantially as described:

F No. = 2.504 Angle of View = 34.50°

| Component | | Radius of Curvature (mm) | Axial Distance Between Surfaces (mm) | N |
|---|---|---|---|---|
| $L_1$ | S1 | $r_1 = 28.0152$ | | |
| | | | $d_1 = 2.0000$ | 1.47454 |
| | S2 | $r_2 = 19.1933$ | | |
| | | | $d_2 = 25.0000$ | |
| $L_2$ | S3 | $r_3 = 20.7703$ | | |
| | | | $d_3 = 4.3030$ | 1.44491 |
| | S4 | $r_4 = -15.9983$ | | |
| | | | $d_4 = 0.5844$ | |
| $L_3$ | S5 | $r_5 = -13.6918$ | | |
| | | | $d_5 = 1.0000$ | 1.44491 |
| | S6 | $r_6 = 112.4142$ | | |
| | | | $d_6 = 1.50001$ | |
| $L_4$ | S7 | $r_7 = -12.6673$ | | |
| | | | $d_7 = 4.9154$ | 1.47454 |
| | S8 | $r_8 = -12.7708$ | | |
| | | | $d_8 = 0.5843$ | |
| $L_5$ | S9 | $r_9 = -11.2291$ | | |
| | | | $d_9 = 1.0000$ | 1.44491 |
| | S10 | $r_{10} = 9.2240$ | | |
| | | | $d_{10} = 0.5001$ | |
| $L_6$ | S11 | $r_{11} = 9.3296$ | | |
| | | | $d_{11} = 6.1444$ | 1.47454 |
| | S12 | $r_{12} = -15.4457$ | | |
| | | | $d_{12} = 6.2607$ | |
| $L_7$ | S13 | $r_{13} = -6.8811$ | | |
| | | | $d_{13} = 1.2501$ | 1.47454 |
| | S14 | $r_{14} = 22.0059$ | | |
| | | | $d_{14} = 2.0000$ | |
| G4 | S15 | $r_{15} = \infty$ | | |
| | | | $d_{15} = 2.5500$ | 1.47454 |
| | S16 | $r_{16} = \infty$ | | |

| F | F1 | F2 | F3 | f1 | f2 | f3 |
|---|---|---|---|---|---|---|
| 25.75 | 151.471 | 20.935 | -21.639 | 15.281 | -10.681 | 14.241 | where the optical lens system comprises lens components L1 to L7 and an optical component G4 having surfaces S1 to S16, and the radius of each surface is given by r followed by an arabic numeral progressively from the object end to the image end of the lens system, and N is defined as a refractive index of the lens material.

14. An image forming optical lens system as defined in claim 7 substantially as described:

F No. = 2.059 Angle of View = 41.80°

| Component | | Radius of Curvature (mm) | Axial Distance Between Surfaces (mm) | N |
|---|---|---|---|---|
| $L_1$ | S1 | $r_1 = 18.8353$ | | |
| | | | $d_1 = 12.43353$ | 1.47454 |
| | S2 | $r_2 = 13.0019$ | | |
| | | | $d_2 = 23.83678$ | |
| $L_2$ | S3 | $r_3 = -8.0093$ | | |
| | | | $d_3 = 0.99913$ | 1.44491 |
| | S4 | $r_4 = 9.8105$ | | |
| | | | $d_4 = 0.63775$ | |
| $L_3$ | S5 | $r_5 = 19.8380$ | | |
| | | | $d_5 = 3.30476$ | 1.44491 |
| | S6 | $r_6 = -8.6331$ | | |
| | | | $d_6 = 1.00041$ | |
| $L_4$ | S7 | $r_7 = 9.3566$ | | |
| | | | $d_7 = 3.93042$ | 1.47454 |
| | S8 | $r_8 = -8.1667$ | | |
| | | | $d_8 = 0.49975$ | |
| $L_5$ | S9 | $r_9 = -7.0495$ | | |
| | | | $d_9 = 0.99974$ | 1.44491 |
| | S10 | $r_{10} = 8.3375$ | | |

-continued

F No. = 2.059 Angle of View = 41.80°

| | | | $d_{10} = 0.50078$ | |
|---|---|---|---|---|
| $L_6$ | S11 | $r_{11} = 8.8786$ | | |
| | | | $d_{11} = 4.05854$ | 1.47454 |
| | S12 | $r_{12} = -9.1986$ | | |
| | | | $d_{12} = 0.09991$ | |
| $L_7$ | S13 | $r_{13} = 18.7655$ | | |
| | | | $d_{13} = 3.28991$ | 1.47454 |
| | S14 | $r_{14} = -10.4052$ | | |
| | | | $d_{14} = 0.75135$ | |
| $L_8$ | S15 | $r_{15} = -7.0579$ | | |
| | | | $d_{15} = 1.56100$ | 1.47454 |
| | S16 | $r_{16} = 33.8019$ | | |
| | | | $d_{16} = 2.0000$ | |
| G4 | S17 | $r_{17} = \infty$ | | |
| | | | $d_{17} = 2.5500$ | 1.47454 |
| | S18 | $r_{18} = \infty$ | | |

| F | F1 | F2 | F3 | f1 | f2 | f3 |
|---|---|---|---|---|---|---|
| 14.38 | -55.308 | 14.673 | -110.615 | 10.556 | -7.931 | 10.869 | where the optical lens system comprises lens components L1 to L8 and an optical component G4 having surfaces S1 to S18, and the radius of each surface is given by r followed by an arabic numeral progressively from the object end to the image end of the lens system, and N is defined as a refractive index of the lens material.

15. A fixed focal length wide angle image forming optical lens system comprising in order from the object end, a first lens group comprising a first component and a second component; a lens stop disposed between said first component and said second component; a second lens group which has a positive focal length and comprises in order from the object end a first component of positive power, a second component of negative power and a third component of positive power, and a third lens group of at least one component, said optical lens system satisfying the following conditions:

$-0.75 < F/F1 < 0.75$ $0.3 < F/F2 < 1.55$ $-1.50 < F/F3 < 0.15$ $0.9 < F2/f1 < 5.0$ $1.2 < |F2/f2| < 7$ $0.9 < F2/f3 < 2.4$ where F is the overall focal length of the lens system, F1, F2 and F3 are the focal length of the first, second and third lens groups, respectively, and f1, f2 and f3 are the focal length of the first, second and third components of the second lens group, respectively.

16. A fixed focal length wide angle image forming optical lens system comprising in order from the object end a first lens group consisting of two components, a second lens group which has a positive focal length and comprises in order from the object end a first component of positive power, a second component of negative power and a third component of positive power, and a third lens group of at least one component, said optical lens system satisfying the following conditions:

$-0.75 < F/F1 < 0.75$ $0.3 < F/F2 < 1.55$ $-1.50 < F/F3 < 0.15$ $0.9 < F2/f1 < 5.0$ $1.2 < |F2/f2| < 7$ $0.9 < F2/f3 < 2.4$ where F is the overall focal length of the lens system, F1, F2 and F3 are the focal length of the first, second and third lens groups, respectively, and f1, f2 and f3 are the focal length of the first, second and third components of the second lens group, respectively.

* * * * *